No. 721,915. PATENTED MAR. 3, 1903.
A. PFAFF.
CASH REGISTER.
APPLICATION FILED MAY 16, 1902.
NO MODEL. 13 SHEETS—SHEET 1.
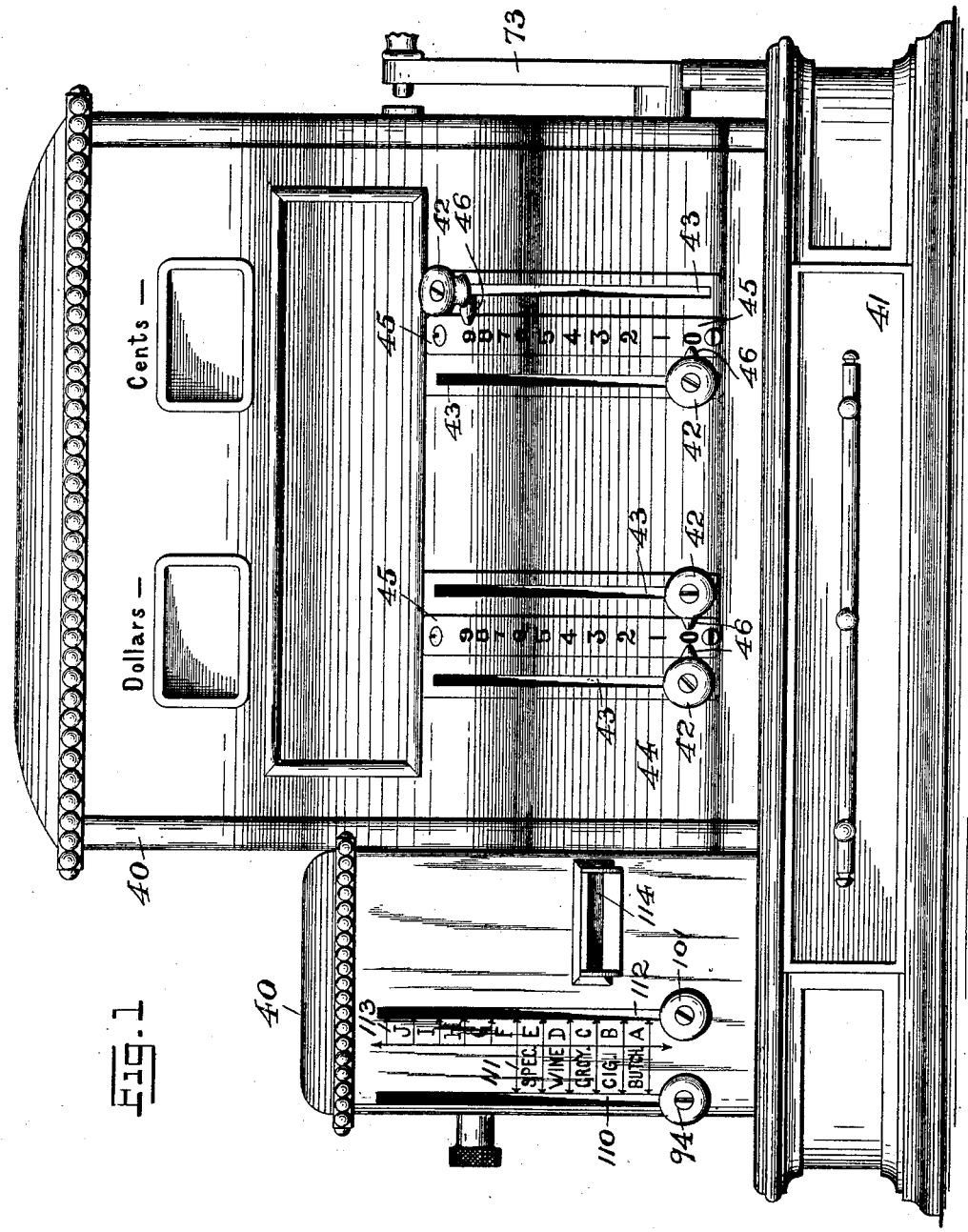
WITNESSES:
Geo. A. Richards
Arthur Marion
INVENTOR
Albert Pfaff
BY
Chas. E. Gill
ATTORNEY No. 721,915. PATENTED MAR. 3, 1903.
A. PFAFF.
CASH REGISTER.
APPLICATION FILED MAY 16, 1902.
NO MODEL. 13 SHEETS—SHEET 2.
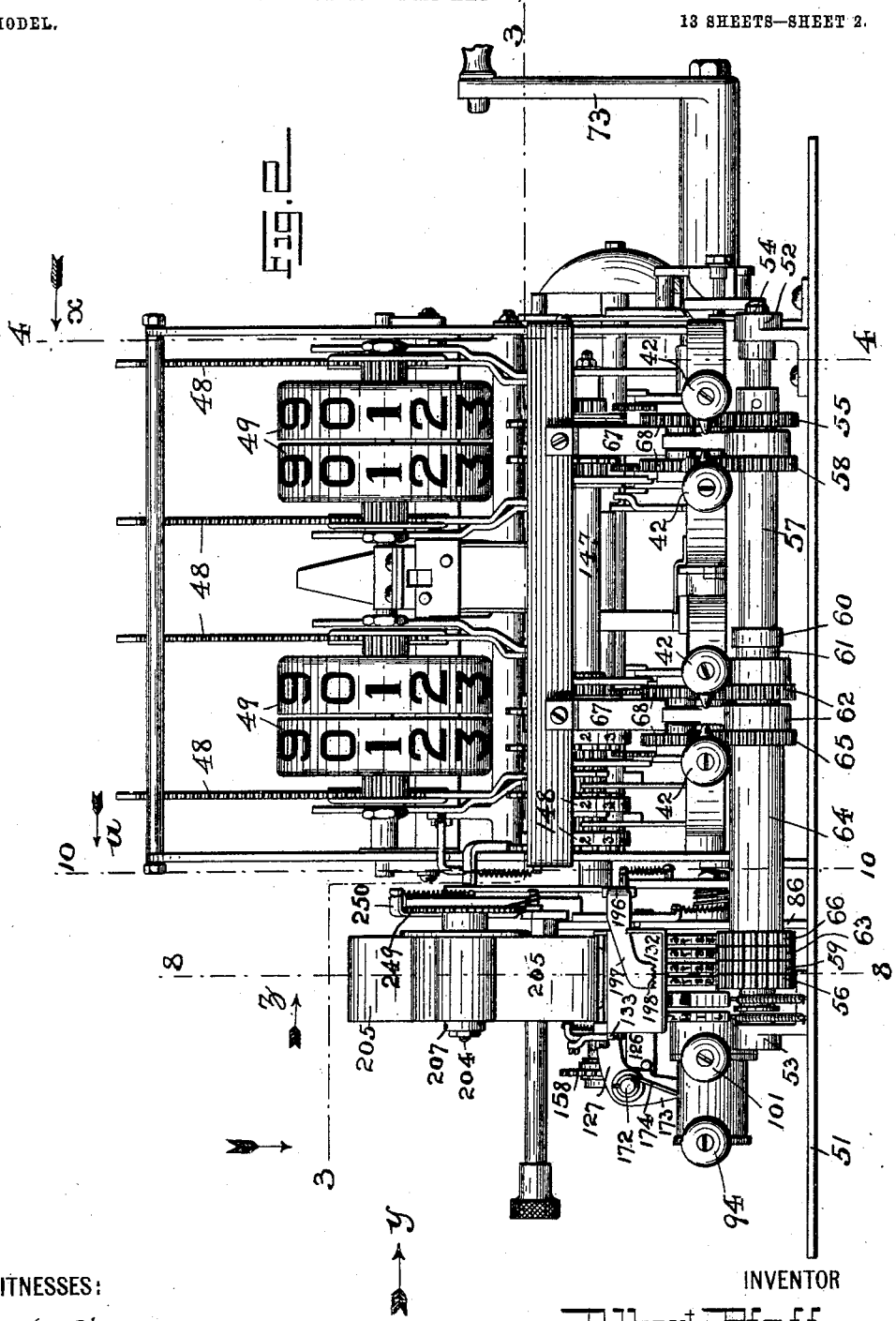
WITNESSES:
Geo. D. Richards
Arthur Marion
INVENTOR
Albert Pfaff
BY
Chas. O. Gill
ATTORNEY
THE NORRIS PETERS CO., PHOTO-LITHO., WASHINGTON, D. C.

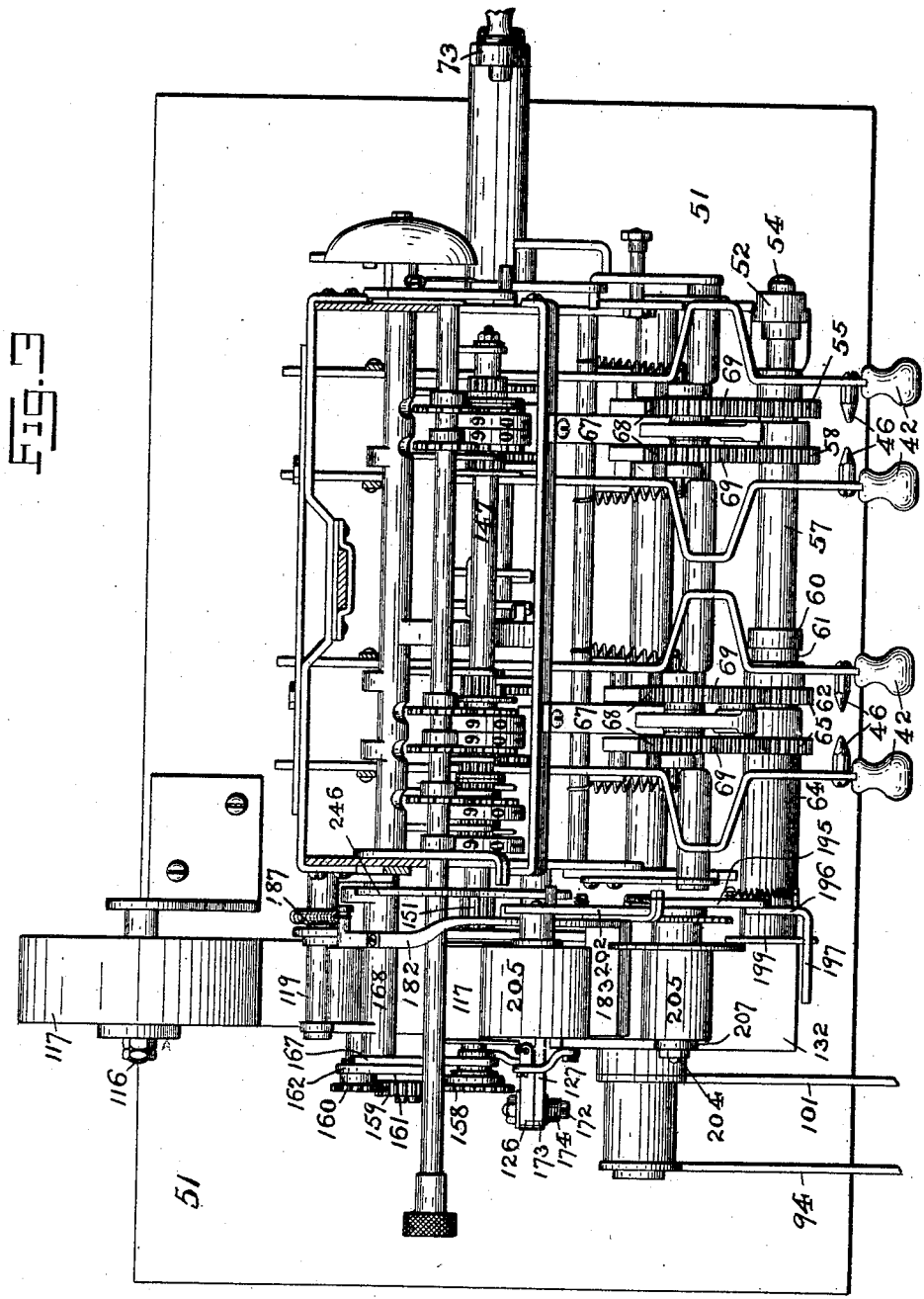

No. 721,915. PATENTED MAR. 3, 1903.
A. PFAFF.
CASH REGISTER.
APPLICATION FILED MAY 16, 1902.
NO MODEL. 13 SHEETS—SHEET 4.
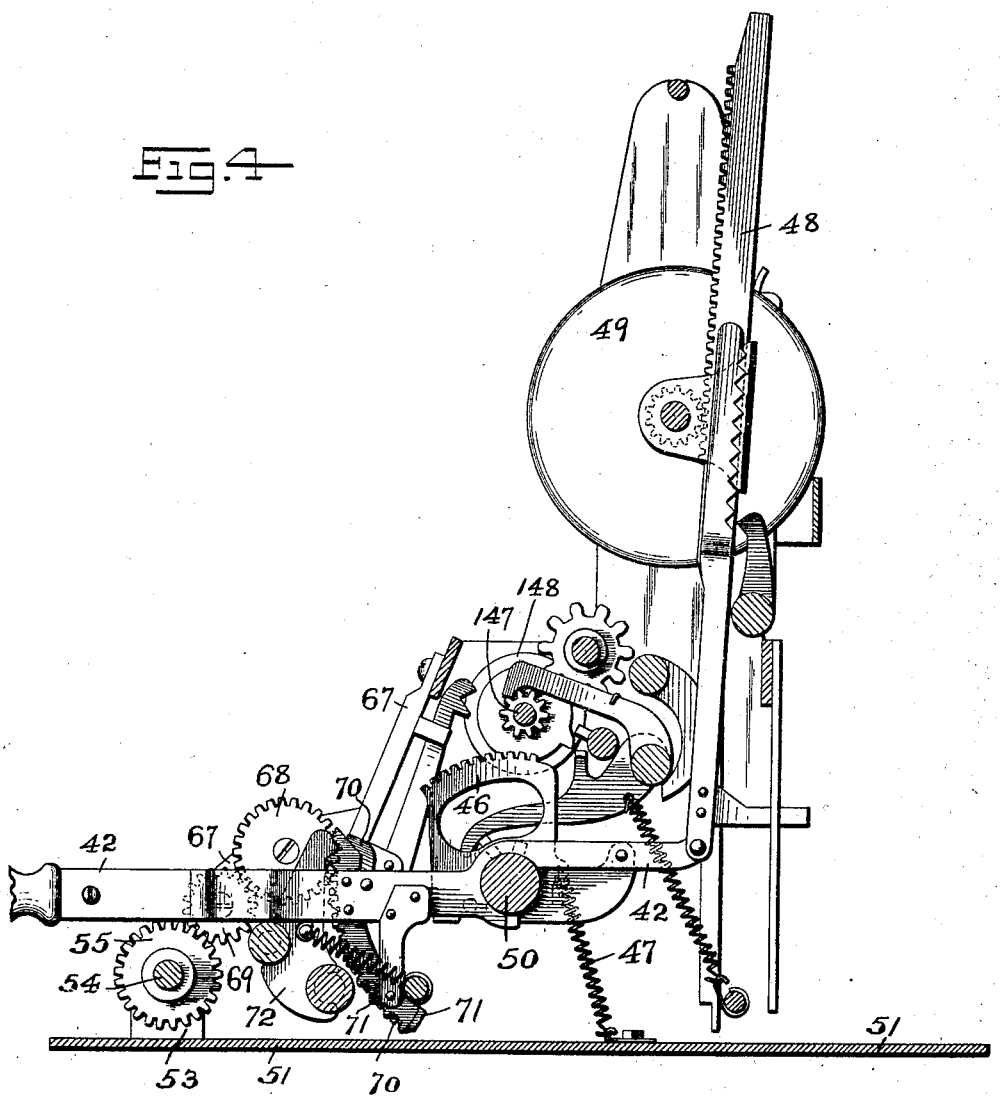
WITNESSES:
Geo. D. Richards
Arthur Marion
INVENTOR
Albert Pfaff
BY
Chas. C. Gill
ATTORNEY

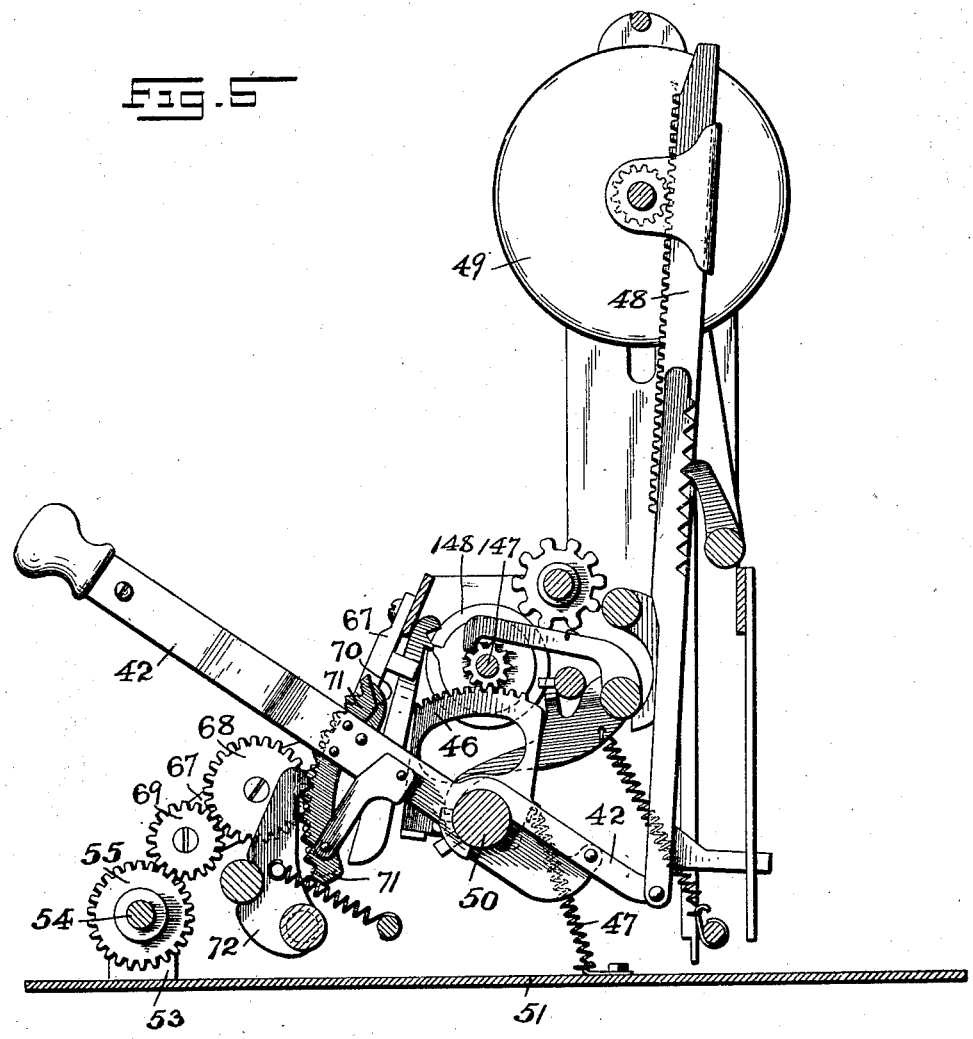

No. 721,915. PATENTED MAR. 3, 1903.
A. PFAFF.
CASH REGISTER.
APPLICATION FILED MAY 16, 1902.
NO MODEL. 13 SHEETS—SHEET 6.
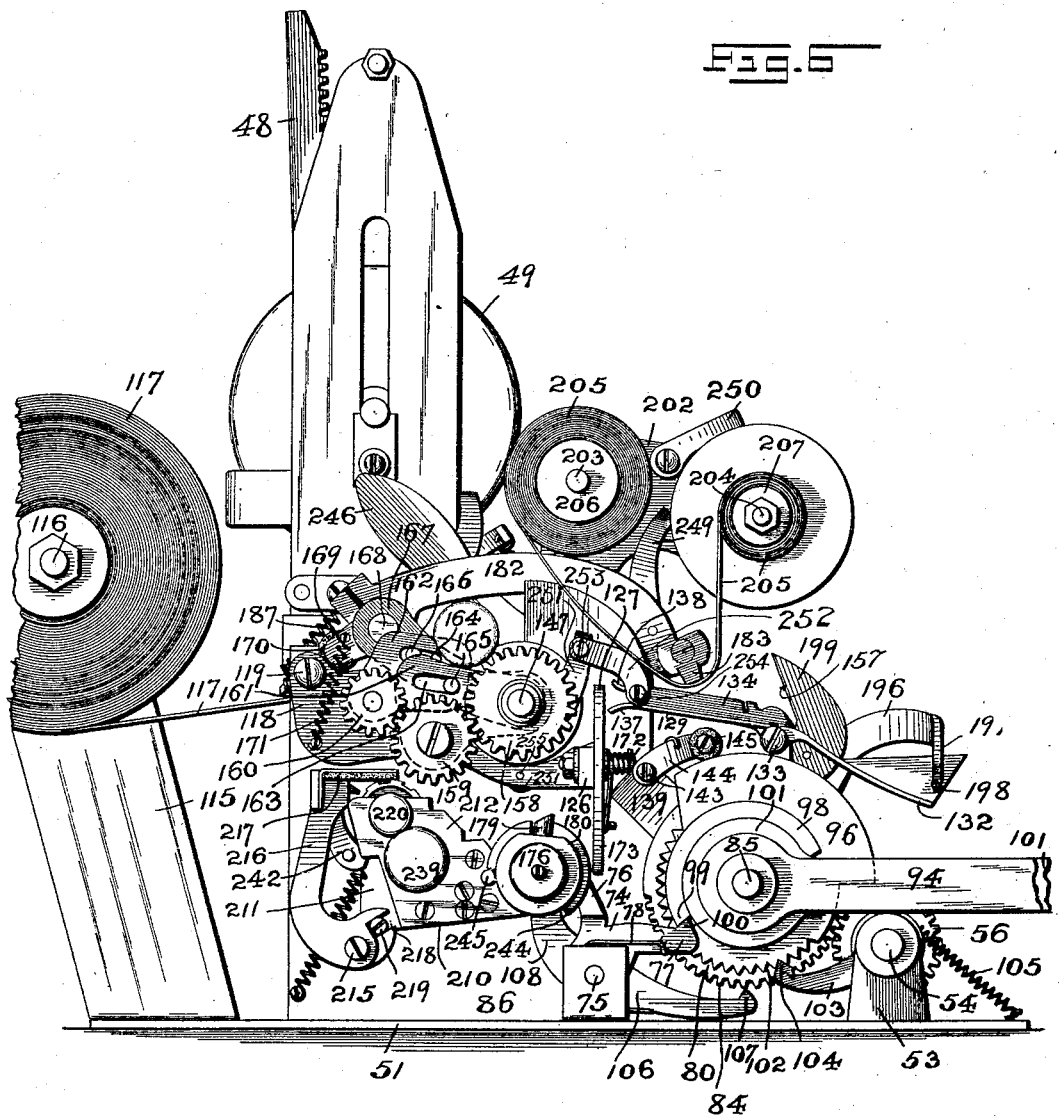
WITNESSES: Geo. D. Richards
Arthur Marion
INVENTOR
Albert Pfaff
BY Chas. C. Gill
ATTORNEY

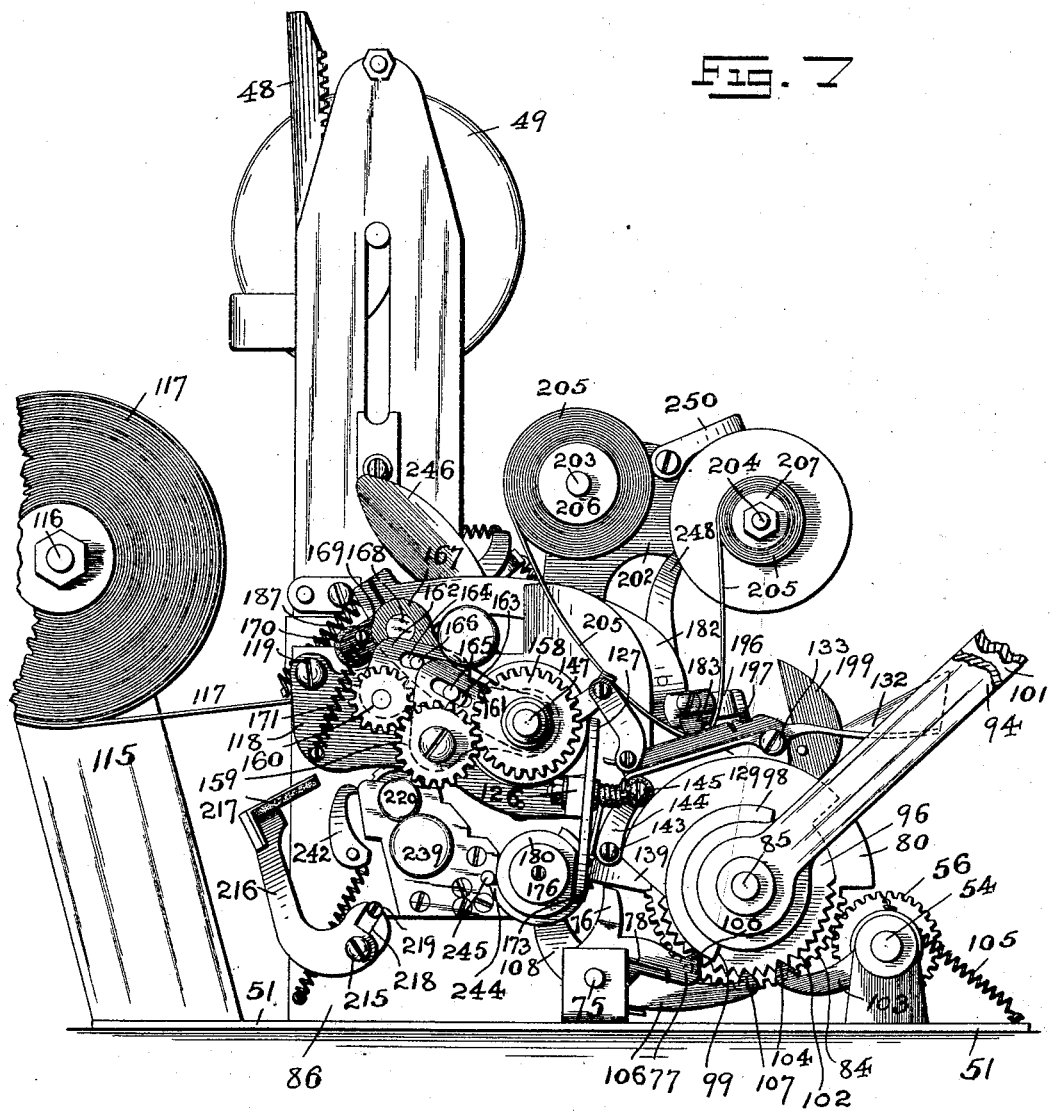

No. 721,915. PATENTED MAR. 3, 1903.
A. PFAFF.
CASH REGISTER.
APPLICATION FILED MAY 16, 1902.
NO MODEL. 13 SHEETS—SHEET 8.
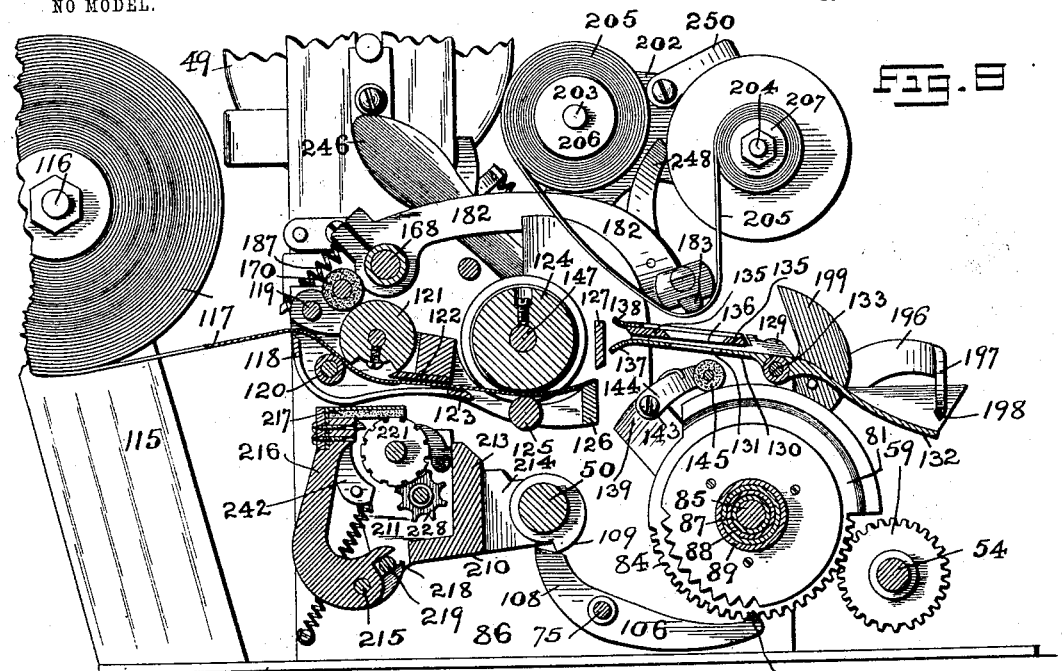
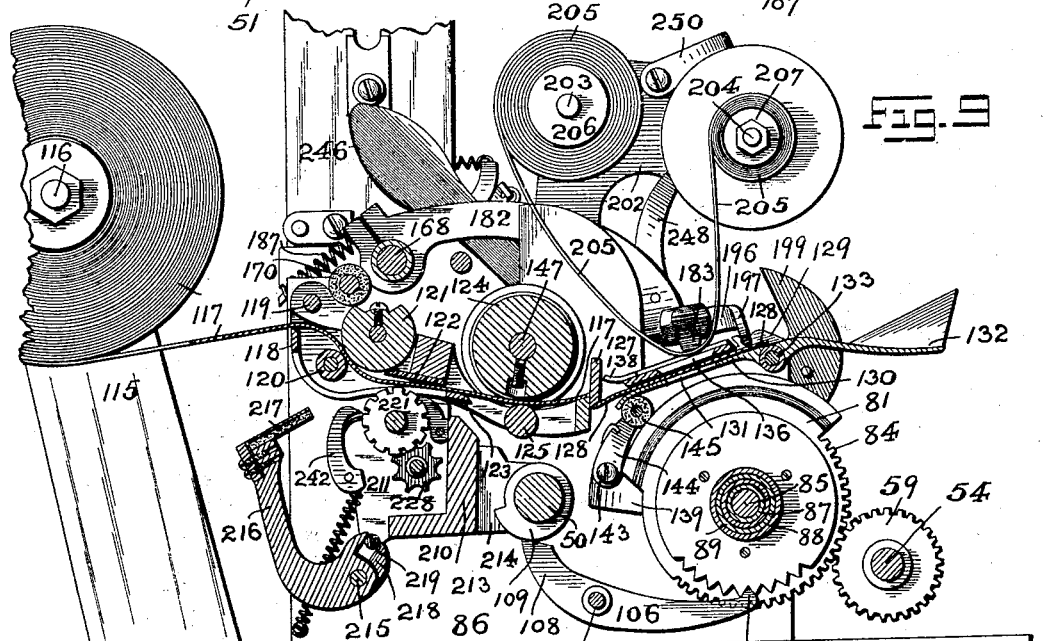
WITNESSES: Geo. H. Richards, Arthur Marion.
INVENTOR Albert Pfaff BY Chas. C. Gill ATTORNEY

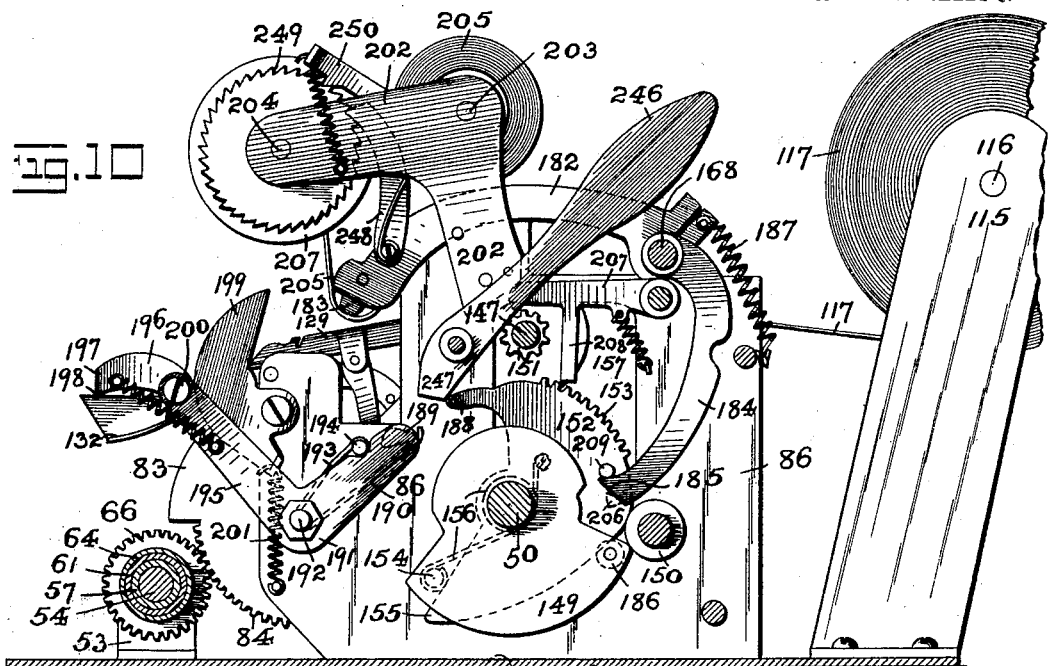

No. 721,915. PATENTED MAR. 3, 1903.
A. PFAFF.
CASH REGISTER.
APPLICATION FILED MAY 16, 1902.
NO MODEL. 13 SHEETS—SHEET 10.
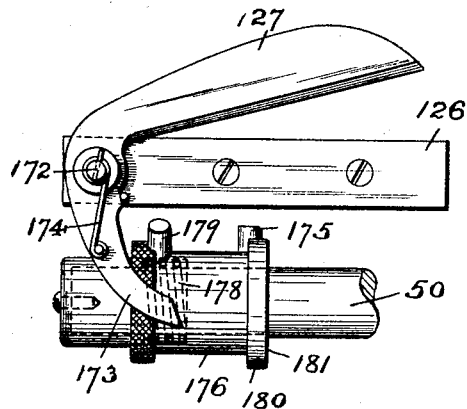
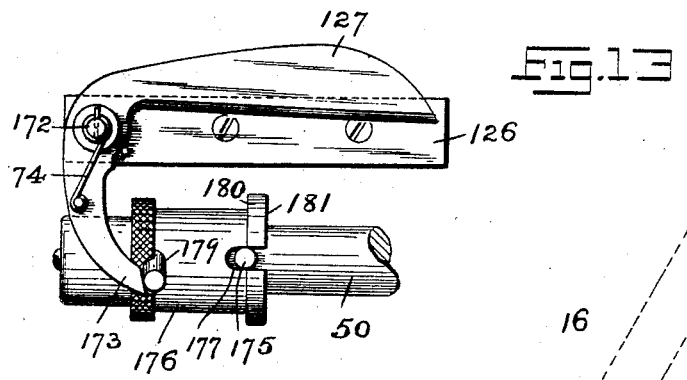
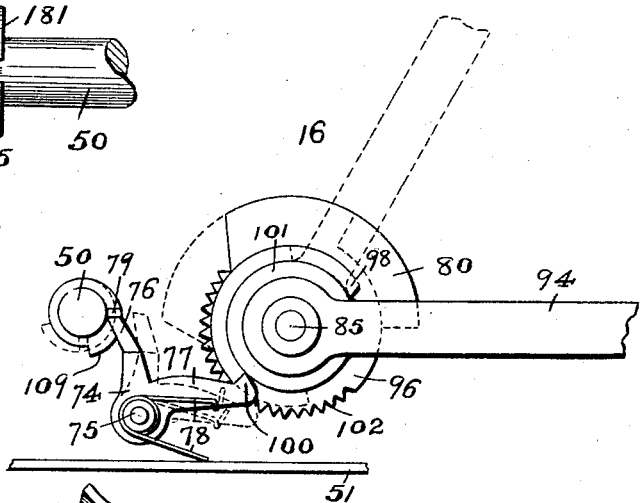
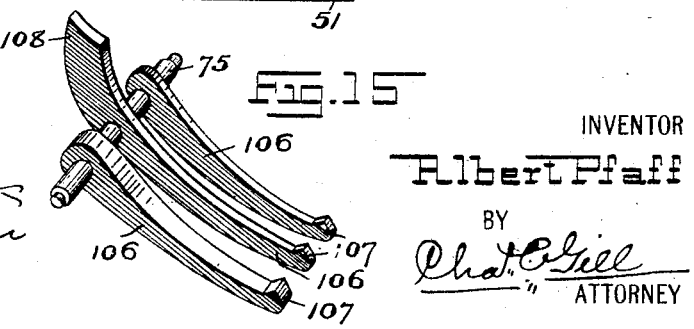
WITNESSES:
Geo. S. Richards
Arthur Marion
INVENTOR
Albert Pfaff
BY
Chas. C. Gill
ATTORNEY No. 721,915. PATENTED MAR. 3, 1903.
A. PFAFF.
CASH REGISTER.
APPLICATION FILED MAY 16, 1902.
NO MODEL. 13 SHEETS—SHEET 11.
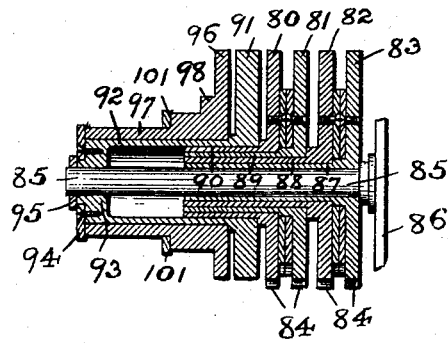
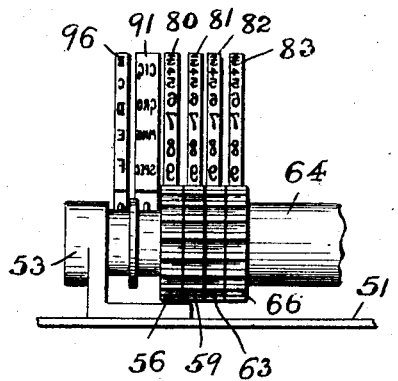
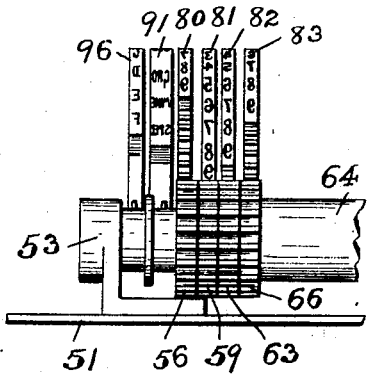
WITNESSES: Geo. D. Richards, Arthur Marion
INVENTOR Albert Pfaff
BY Chas. C. Gill
ATTORNEY

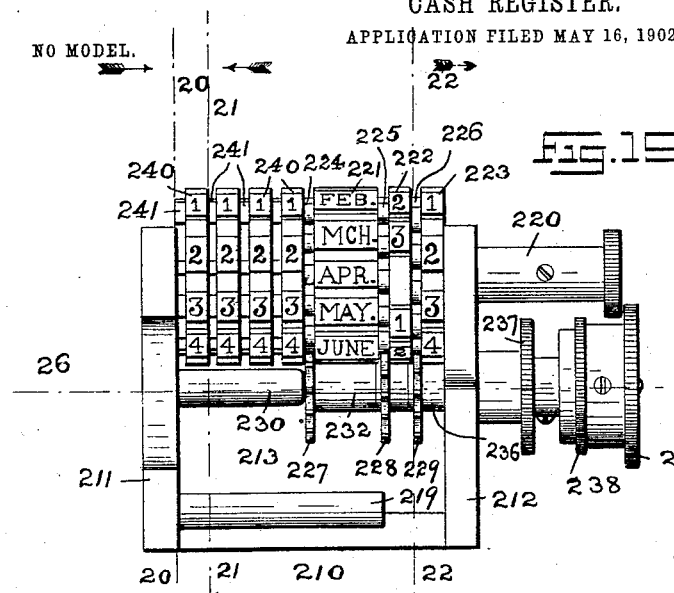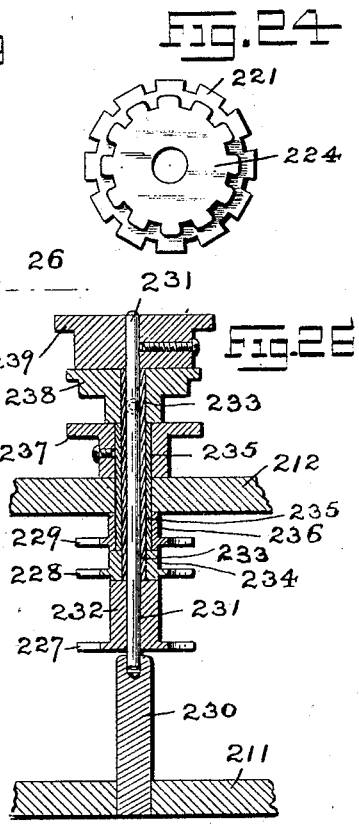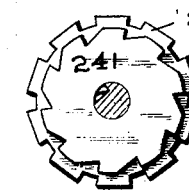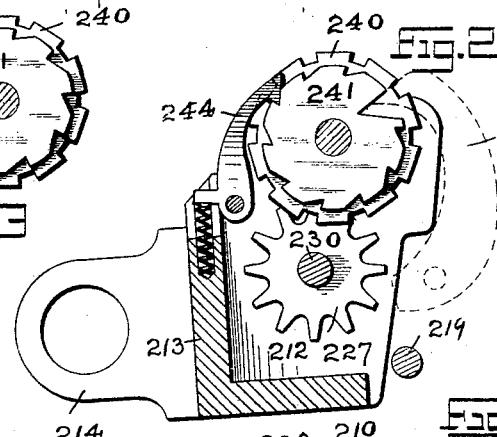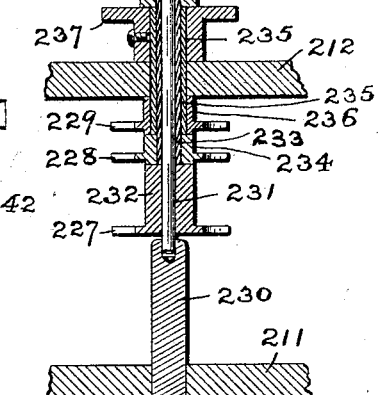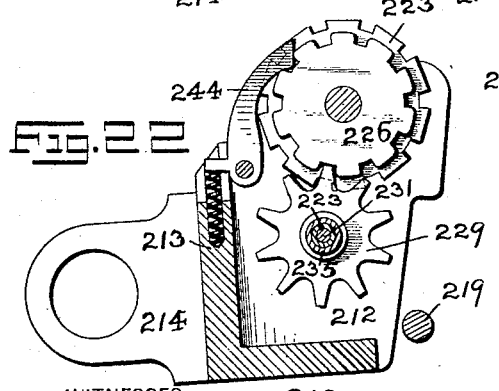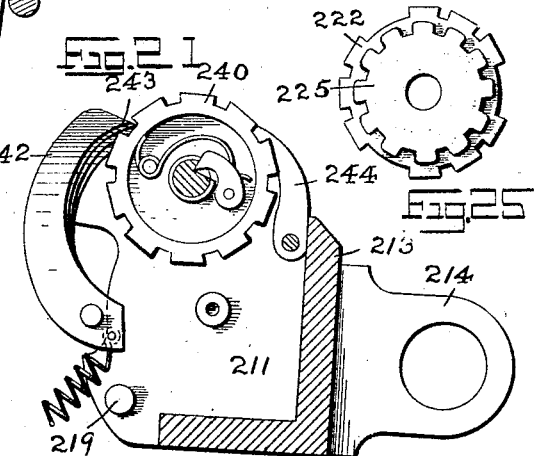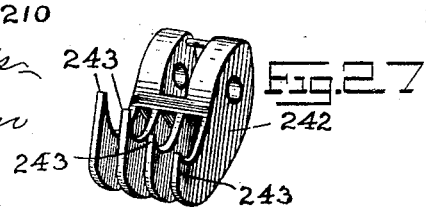

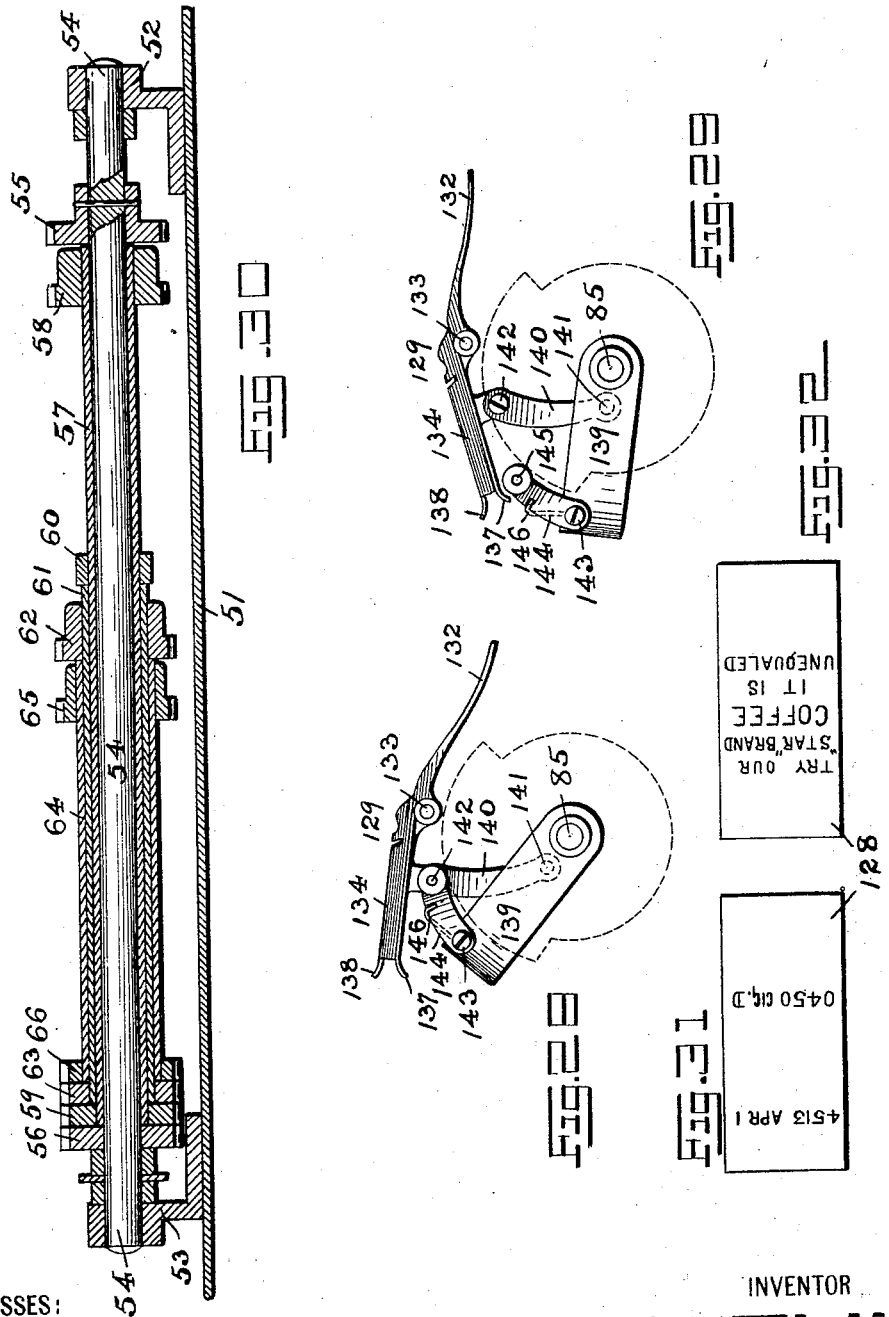

UNITED STATES PATENT OFFICE.

ALBERT PFAFF, OF NEW BOUNDBROOK, NEW JERSEY, ASSIGNOR TO IDEAL CASH REGISTER COMPANY, OF NEW BOUNDBROOK, NEW JERSEY, A CORPORATION OF NEW JERSEY.

CASH-REGISTER.

SPECIFICATION forming part of Letters Patent No. 721,915, dated March 3, 1903.

Application filed May 16, 1902. Serial No. 107,567. (No model.)

*To all whom it may concern:*

Be it known that I, ALBERT PFAFF, a citizen of the United States, and a resident of New Boundbrook, in the county of Middlesex and State of New Jersey, have invented certain new and useful Improvements in Cash-Registers, of which the following is a specification.

The present invention has reference to improvements in cash-registers of the character fully described and illustrated in Letters Patent granted to E. F. Spaulding on January 9, 1900, and respectively numbered 640,825 and 640,966, and more particularly to improvements in the construction of cash-register described and illustrated in Letters Patent No. 677,896, issued July 9, 1901, in which the operator moves the exposed actuating or setting levers along lines of numerals provided upon the front face of cash-register for the purpose of setting certain interior segments into proper operative relation to the registering mechanism, and thereafter the operator by moving an exposed crank or handle places the gearing of the registering mechanism into direct engagement with said segments and effects the movement of the said segments to their normal position, whereby said segments are caused to operate the registering mechanism to the extent desired and governed by the position given to said segments by the said actuating or setting levers.

The primary objects of the present invention, therefore, are to provide with mechanism of the character above specified means which are controlled or actuated by the said register mechanism, first, for printing upon a tape or roll of paper the various amounts to be registered; secondly, for printing upon and delivering from the cash-register a ticket bearing various inscriptions, such as the amount registered, the date of sale, the number or initial of the clerk who has made the sale, and the department of sales or kinds of goods sold; and, thirdly, to so arrange the mechanism that the recording-tape may be used independent of the ticket printing and delivering means, or vice versa, or that both may be used at the same time during the operation of the main registering mechanism of the cash-register.

Other objects of this invention not at this time particularly specified will be obvious from the detailed description of the present invention.

The invention is clearly illustrated in the accompanying drawings, in which—

Figure 1 is a front elevation of a cash-register constructed in accordance with and embodying the principles of the present invention. Fig. 2 is a front elevation of the various interior mechanism in their normally inoperative position, illustrating the same upon a base or shelf by means of which the same is to be arranged in the register-casing, the latter, however, being omitted. Fig. 3 is a horizontal section taken on line 3 3 in said Fig. 2 directly below the indicating cylinders or drums, the said view illustrating the registering mechanism, the actuating or setting levers, the recording-tape device, the ticket-printing mechanism, and intermediate operating devices—such as the segments, gears, and operating-spindles—all in plan or top view. Fig. 4 is a vertical cross-section taken on line 4 4 in said Fig. 2 looking in the direction of the arrow X, the indicating cylinders or drums being represented in their lower or concealed position, the actuating or setting levers and the various sections and gear devices actuated from said levers being represented in their normally inoperative positions. Fig. 5 is a similar cross-section on the same line and of the same parts, but the indicating cylinders or drums being represented in their raised and exposed positions with the actuating or setting levers raised and the various sections and gear devices brought into their operatively-engaged relation by the raised levers. Fig. 6 is an end view of the interior mechanism looking in the direction of the arrow Y in Fig. 2, said view illustrating, on an enlarged scale and more particularly, the initial normal positions of the tape-recording device, the card printing and delivery mechanism, and other parts and devices which constitute a part of the mechanism. Fig. 7 is a similar view of the said devices illustrated in said Fig. 6, but the various parts being represented in their operated positions. Fig. 8 is a detailed vertical cross-section of the recording-tape device and the card printing and delivering mechanism in the initial normal position, said section being taken on line 8 8 in Fig. 2 of the drawings and looking in the direction of the arrow Z. Fig. 9 is a similar cross-section of the same devices, but the parts being represented in their operative positions, the recording-tape being in its relative position while having a number printed thereon and the card-delivery mechanism being in the act of delivering the printed card for presentation to the purchaser or operator of the machine. Fig. 10 is a vertical cross-section of the various parts of mechanism connected with the recording-tape device and the card printing and delivery mechanism in their initial normal positions, said section being taken on line 10 10 in said Fig. 2 looking in the direction of the arrow U in said figure. Fig. 11 is a similar view of the same parts in their actuated positions. Fig. 12 is a face view of a shears or cutter and a device for actuating the same for cutting or severing a card or ticket from a roll or tape of paper, the parts being represented in their normally inoperative positions; and Fig. 13 is a view of the same parts, the shears or cutter being shown in its actuated position. Fig. 14 is a detail end view of the ticket-printing dials and a face view of a lock catch or pawl connected therewith for locking the entire mechanism of the cash-register until actuated by one of the setting-levers connected with the said printing-dials. Fig. 15 is a perspective view of a set of holding or locking fingers which are brought in holding engagement with the said printing-dials to hold the same against turning while inking the disks or dials and while the ticket or card is being printed. Fig. 16 is a vertical section of the said printing dials or disks. Figs. 17 and 18 are face views of the said ticket-printing dials or disks and a portion of the actuating-spindle which is operated from the intermediate gears and segments connected with the main actuating or setting levers, said views illustrating in connection therewith a set of gear or toothed wheels for independently actuating the said printing disks or dials, said Fig. 17 illustrating the parts in their initial normal positions, and Fig. 18 represents those of the printing dials or disks actuated and the two dials or disks for printing the kind of sale and the initial or number of the clerk also, being represented in their actuated positions. Fig. 19 is a rear face view of a pivotally-arranged printing device for printing the date and the numbers of the sales in their consecutive order upon the ticket or card. Fig. 20 is a vertical cross-section of the same, taken on line 20 20 in said Fig. 19 when looking in the direction of arrow at the extreme left of said Fig. 19. Fig. 21 is a similar cross-section taken on line 21 21 in said Fig. 19 when looking in the direction of the intermediately-placed arrow in said Fig. 19, and Fig. 22 is a similar cross-section taken on line 22 22 when looking in the direction of arrow at the right of said Fig. 19. Figs. 23, 24, and 25 are face views of the various numbering and dating disks of the device represented in said Fig. 19. Fig. 26 is a horizontal section taken on line 26 26 in said Fig. 19, and Fig. 27 is a perspective view of a set of actuating-fingers for moving or actuating the various numbering-disks. Fig. 28 is a side view of a pivoted inking roll or pad for inking the printing disks or dials represented in said Figs. 14, 16, 17, and 18, the printing-disks being indicated in dotted outline and the said view illustrating in connection therewith the position of the ticket or card delivery table while delivering the said ticket or card; and Fig. 29 is a similar view of the parts represented in said Fig. 28, but illustrating the ticket or card delivery table in its tilted position just after having received a ticket or card and while the ticket is being printed. Fig. 30 is a longitudinal vertical section of the main spindle and tubular spindles thereon with the various gears for causing the independent oscillating motions of said main spindle and said tubular spindles and the gear or toothed wheels for actuating the previously-mentioned printing disks or dials. Figs. 31 and 32 are the rear and front faces, respectively, of a printed and delivered ticket or card.

Similar characters of reference are employed in all of the said above-described views to indicate corresponding parts.

Referring to the several figures of the drawings, the reference character 40 designates the exterior shell or casing of the register, and 41 is the usual cash-drawer.

The main actuating or setting levers are designated by the numerals 42, and said levers extend frontward through slots 43, formed in the front plate 44 of the register, the said plate being furnished with the columns of numerals 45, ranging from "0" to "9," inclusive. Each actuating or setting lever 42 is provided at or near the point where it projects from the slot 43 with an index-hand or pointer 46, extending in a lateral direction and sliding directly in front of the column of numbers 45, so that the operator may know at what point or opposite what number in the column the actuating-lever is to be set. The initial position of each main actuating or setting lever 42 is indicated more particularly in Fig. 3 of the drawings and is at the lower end of the slots 43, as indicated in Fig. 1, and when it is desired to register and indicate the amount of a sale the said levers (or more of them, as may be necessary) will be moved upward to proper positions along the line of said slots under the guidance of the columns of numerals 45 on the front plate 44.

Each actuating or setting lever is provided with a segment 46, and each segment is adapted to have an independent motion and is equipped with a spring 47, and the force of said spring is normally exerted to pull downward on the rearwardly-extending portions of the segments, so as to keep the segments in condition to automatically follow the levers 42 when the latter are elevated. The actuating or setting levers 42 during their upward motion perform two main functions, the first being to "set" the segments 46 and the second being, through vertical racks 48, to actuate or set the indicating cylinders or drums 49. The segments 46 are loosely mounted upon the main driving or operating shaft 50 and automatically follow the actuating-levers 42 under the influence of the coiled springs 47, connected with said segments, as above stated.

The arrangement and construction of the hereinabove-described mechanism and other means connected therewith for causing the registration during the return of the segments to their frontward and initial position are fully illustrated and described in the previously-mentioned Letters Patent No. 677,896 and will therefore not be more fully described herein.

Now, having in a general way described the general arrangement of the parts of the register-operating mechanism which are old, I will now set forth the general arrangement and construction of the various printing devices and card or ticket delivering mechanism which embody the principles of my present invention and a novel means for actuating and controlling the said mechanism by means of one or more auxiliary setting-levers and the said main actuating or setting levers 42.

Upon a suitable base 51, which may form a part of the cash-register body, are arranged a pair of bearings 52 and 53, in which is arranged so as to oscillate in said bearings a main spindle or shaft 54. Upon this main spindle or shaft 54 are secured in any suitable manner a pinion 55 and an actuating-gear 56 at or near the bearing 53 at the other end of the said main spindle or shaft 54. Arranged directly upon the said main spindle or shaft 54, between the said pinion 55 and the gear 56, and capable of having an independent oscillatory motion on said spindle or shaft 54 is a tubular spindle 57, provided at one end with a pinion 58 and at its opposite end with a gear 59. Upon this spindle 57, between the said gear 59 and a collar or nut 60 on said spindle 57, is a tubular spindle 61, provided with a pinion 62 at one end and a gear 63 at its other end, and movably arranged upon the spindle 61, between the pinion 62 and gear 63, is another tubular spindle 64, having at the one end thereof a pinion 65 and at its other end a gear 66, all of which will be clearly understood from an inspection of Fig. 30 of the drawings. Suitably secured at the opposite sides of suitably-disposed brackets 67, connected with the framework of the cash-register or any other suitable holding means and adapted to be actuated from each actuating or setting lever 42, are four sets or trains of gears, each comprising a main gear 68 in mesh with an idler 69, and the idlers 69 of the respective sets or trains of gears being, respectively, in operative mesh or engagement with the various pinions 55, 58, 62, and 65 of the respective spindles or shafts 54, 57, 61, and 64, and whereby any one or all of said spindles may be actuated independently of each other to separately actuate their gears 56, 59, 63, and 66, according to which one of the said actuating-levers 42 has been moved in an upward direction. Each gear 68 receives its rotary motion from a segmental rack 70, attached to the side of the actuating or setting levers 42, and upon each setting or actuating lever 42 are a spring-controlled locking-rack 71 and spring-actuated pawl or dog 72 for locking or setting said levers 42 against movement, except when the said main shaft 50 has been released in the manner to be hereinafter more fully set forth and when a crank-arm or handle 73, connected with said shaft 50, is moved from its upper and previously-operated to its lower position. The manner of locking the actuating or setting levers 42 is substantially that set forth in Patent No. 690,472, issued to Smith and Giles January 7, 1902. Under normal conditions the said main shaft or spindle 50 is locked against rotary motion by means of a holding catch or dog 74, pivoted upon a bracket 75 and comprising a pair of arms or fingers 76 and 77, one of which, as 76, is forced in normal holding engagement by means of a spring 78 with a stop 79 on said main spindle 50, as indicated in Fig. 14, to prevent any motion of said spindle. Thus it will be clearly understood that for each actuating-lever 42 there are one set of gears 68 and idlers 69 for actuating the variously-arranged and independently-acting spindles 54, 57, 61, and 64 for actuating a set of printing disks or dials at the one side of the device. These disks or dials are indicated by the reference characters 80, 81, 82, and 83 and are respectively provided with a gear-tooth portion 84, whereby the disk 80 is in operative mesh with the gear 56, the disk 81 with the gear 59, the disk 82 with the gear 63, and the disk 83 with the gear 66, and each disk 80, 81, 82, or 83 is therefore capable of an independent and partial rotary movement for presenting the proper number or numbers to the face of the ticket to be printed thereon. The partial rotary movements of the said printing-disks 80, 81, 82, and 83 are simultaneously with the movements of the main registering mechanism of the device and are governed by the positions given by the operator to the actuating or setting levers 42, as will be clearly evident. These various printing-disks 80, 81, 82, and 83, as will be seen from Fig. 16, are arranged upon a pin 85, which extends from the side of a portion 86 of the frame of the machine, the said disk 83 having a long tubular hub 87 arranged directly upon the pin 85, the disk 82 having a shorter hub 88 arranged upon the hub 87, the disk 81 having a shorter hub 89 arranged upon the hub 88, and the disk 80 having a still shorter hub 90, which is arranged upon the hub 89, as shown, each disk being capable of independent movement when actuated by the respective gears 56, 59, 63, and 66. Capable of an independent rotary motion upon the hub 90 is a printing-disk 91, bearing upon its peripheral surface names indicating the different departments in a store—such as "groceries," "cigars," "special," and the like—the said disk 91 being provided with a tubular hub 92, bearing upon the hub 90 and having a bearing portion 93, which is arranged directly upon a part of the pin 85, as shown. Suitably secured to the end of the said portion 93 of the hub 92 of said disk 91 is an auxiliary actuating or setting lever 94 for properly setting the said disk 91, a nut or washer 95 being secured upon the end of the pin 85 for properly retaining the several disks in their operative and independently rotative positions upon said pin.

Movably arranged upon the hub 92 of the disk 91, between the said disk and that part of the actuating or setting lever 94 by means of which said lever is secured against said hub 92, is the hub 97 of another printing-disk 96, bearing upon its peripheral surface certain characters, such as letters or numbers, which indicate the clerk operating the machine. The said disk 96 is made at one side with a shoulder 98, having a stop 99, against which the end 100 of the previously-mentioned arm 77 of the device 74 rests, and thereby locks the entire mechanism of the register against actuation until the said disk 96 has been first set by a second auxiliary actuating or setting lever 101, whereby the end 100 is depressed by having been brought from its holding engagement (indicated in Fig. 6) to a position upon the circular edge of the shoulder 98, as indicated in Fig. 7, and whereby the arm 76 of the device 74 is disengaged from its holding or locked engagement with the stop 79 on the main shaft 50 to permit the said shaft to be actuated by means of its handle and to operate the entire mechanism of the cash-register.
As illustrated, the said disks 91 and 96 are both provided with the serrated parts 102, with which is in sliding engagement the end or ends 104 of a detent or detents 103, pivotally arranged upon the spindle 85, said ends 104 being constantly forced in their upward directions by springs 105, which are attached to the said detents and the base-plate 51, as shown. In addition to the said detents 103 for holding the disks 91 and 96 in their set positions against accidental displacement while operating the registering mechanism a set of fingers 106, each provided with a holding end 107, are secured upon the spindle 75, and one of said fingers being made with a rearwardly and upwardly extending member 108, with which is brought in sliding contact a cam member 109 on the shaft 50 when the latter is operated to depress said member 108 and bring the ends 107 of said fingers 106 in holding engagement between the gear-teeth 84 of the printing-disks 80, 81, 82, and 83 to hold said disks against turning while the handle of the main shaft 50 is at its lowest point during the operation of delivering the printed ticket or card and before returning the various mechanisms to their initial normal positions.

As will be seen from an inspection of Fig. 1 of the drawings, the auxiliary actuating or setting lever 94 extends frontward through a slot 110, formed in the front of the casing, and being furnished with a column 111 of words which indicate the different departments of the store and to either of which the lever 94 can be moved to set the printing-disk 91 for indicating the department in which the sale is made upon the ticket or card. The auxiliary actuating or setting lever 101 extends frontward through a slot 112 in the front of the register-case and can be moved along the side of a column 113, bearing letters or other devices which indicate the respective clerks of the store, and to any one of such letters or devices the clerk sets the lever 101 when it is desired to register a sale, whereby the printing-disk 96 is set for printing the initial or number of the clerk upon the ticket and at the same time releasing the entire mechanism of the machine on account of the disengagement of the detent 74 from the stop 79 on the main shaft 50 in the manner previously described.

Having thus described the printing device for printing the sale upon the ticket, I will now describe the mechanism for producing the tickets and for presenting such tickets to the printing device and the means for ejecting the ticket from a slot 114 in the front of the register-case.

Referring now more particularly to Figs. 6, 7, 8, 9, 10, and 11 of the drawings, the reference character 115 indicates any suitable support or post which is provided with a pin or spindle 116 for the reception of a roll of paper 117, the free end of said paper, as will be seen more particularly from Figs. 8 and 9, being fed into a pivoted supporting or guiding frame 118, pivoted at 119, and then above a guide-roll 120, beneath a printing-roll 121, which may be provided with any special advertisement, then between a pair of guide-plates 122 and 123 and between a pair of feeding-rolls 124 and 125 to an edge plate or bar 126, against which is brought the cutting edge of a knife or cutter 127 for cutting the paper, and thereby producing the ticket or card 128, which is next delivered into a holder or guide-plate 129, in which it is retained for a time, while the lower surface of the said ticket is pressed against the "set" printing-disks 80 81 82 and 83, 91 and 96. The said plate or holder 129 consists, essentially, of a base-plate 130, provided with a suitable opening 131 and a delivery portion or shelf 132, the said shelf forming an integral part of the base-plate 130 and being fulcrumed on a pin 133, extending from the side of the frame portion 86 of the machine. The said base-plate 130 also has a pair of side bars 134, forming guides, and a pair of laterally-extending members 135, forming an opening 136, as shown in Figs. 8 and 9. The free end of the paper passes between a pair of oppositely-curved members 137 and 138 and upon the base-plate 130, directly over the opening 131 therein, where the ticket is held by the laterally-extending members 135, while the under surface of the ticket is pressed against the several printing-disks directly beneath the pivoted holder 129 by the mechanism to be hereinafter described. Extending in a rearward direction and pivotally arranged upon the pin 85 is an arm 139, which is actuated from a link 140, which is pivoted by means of a pin 141 at its lower end to said arm and by means of a pin 142 at the upper end to the pivoted base-plate 130 of the ticket or card holder 129. Pivotally attached by means of a pin 143 to the free end of said arm 139 is a spring-pressed arm 144, bearing an inking-roller 145, which is made to bear against and ink the printing-surfaces of the various printing-disks 80 81 82 and 83, 91 and 96 by the spring 146.

Under normal conditions the holder or guide-plate 129 and the inking roll or pad 145 are in the positions indicated in said Fig. 28; but when the said holder or plate 129 has been actuated by the mechanism to be described then will these various parts be in the positions represented in Fig. 29.

The means, which is controlled by the downward motion of the pivoted supporting or guiding frame 118, for oscillating the ticket or card holder and bringing the ticket or card therein into its printing relation above the printing-disks is illustrated in Figs. 6 and 7, and it consists, essentially, of a pair of links 251 and 252, pivotally connected, as at 253, the said link 251 being journaled at its lower end on a pin 255 on said frame 118 and the link 252 being pivotally connected with the ticket or card holder by means of a screw or pin 254, substantially as illustrated. Thus after the inking-roller 145 has moved from its inking position above the printing-disks the downward movement of said frame 118, produced by the shaft 147, as has been stated, causes the said links 251 and 252 to spread, whereby the pivoted ticket or card holder is brought into its printing relation above the said printing-disks.

In addition to these various mechanisms just described I may employ a printing mechanism for printing the date of sale upon the lower surface of the tape 117 just before it enters beneath the knife or cutter 127 to be cut into a ticket or card 128 and also with an independently-acting tape mechanism or device upon which the amounts of all the sales registered are printed; but before describing the particular arrangement and construction of these two devices I will first set forth the manner of actuating the feed-rollers 124 125 and the printing roll or cylinder 121 for feeding the end of the tape 117 beneath the cutter 127 to be cut into a ticket which is delivered into the card or ticket holder and also the manner of actuating the said holder for the purpose of presenting the surface of the ticket or card to the printing-disks 80, 81, 82, 83, 91, and 96 and a grasping device for forcing the printed ticket into and from the delivering-slot 114 in the register-case.

Referring now to Figs. 4 and 5 of the drawings, the reference character 147 indicates the register-wheel shaft bearing the register-wheels 148, set forth in the said Letters Patent numbered 677,896. This shaft, as is fully set forth in said patent, is made to descend in its lower position, (indicated in Fig. 5,) when the exposed crank or handle 73 is pulled forward toward its horizontal position by bringing the cam-disk 149 on the main shaft 50 (see Figs. 10 and 11) against a roller 150, which is moved rearward and by means of an intermediately-arranged mechanism (not shown in the present drawings, but illustrated in Fig. 24 of said Patent No. 677,896) thus lowers the said shaft 147. The turning movement of the register-wheel shaft 147 is accomplished by a pinion 151 on said shaft, with which is brought in operative mesh the gear-teeth 153 of a cam-disk 152, which is loosely arranged upon the main shaft 50, but is caused to rotate when a laterally-extending pin or stud 154 on the disk 149 is brought in operative contact with the marginal edge 155 of said cam-disk 152. A suitable spring 156, which has one end secured to said pin or stud 154 and then presses around the shaft 50 and has its other end fastened directly to said cam-disk 152, will return these parts to their initial normal positions when the crank or handle 73 is returned to its normally vertical position, as will be clearly understood.

The previously-mentioned shaft 147 extends directly through an open part in the frame portion 86 and has arranged thereon the previously-mentioned feed-roll 124, the said shaft 147 being capable of being lowered by the mechanism and for the purposes stated in the previously-mentioned Letters Patent No. 677,896, and the one end portion of said shaft 147 being journaled in a swing-frame 167, hereinafter mentioned. It will be clearly understood that when the shaft 147 is lowered said roll 124 is also lowered, and with it the entire frame 118 and its parts, thereby bringing the lower surface of the tape 117 directly upon the dating mechanism, to be hereinafter described, and printing the date upon the under surface of the tape 117. In order that the printing-roll 121 may be operated and that the feed-rolls 125 and 120 by their frictional contact with the respective rolls 124 and 121 may feed the tape 117 to the cutter 127, the spindle 147 is provided at its free end with a gear 158, which actuates an idler 159, and this in turn drives a gear 160, connected with the pin or spindle to which the printing-roll 121 is secured. In order that the said gears 158, 159, and 160 will not jam during the downward motion of the register-wheel shaft 147 and its parts thereon when lowered and before turning and so as to keep the wheel or roll 124 from turning until said shaft 147 is turned, the said gears 159 and 160 are respectively connected with the plates 161 and 162, provided with the respective slots 163 and 164 and having slight independent movements upon suitably-arranged pins 165 and 166, due to the fact that the gears 158 and 160 are placed on pivotally-arranged frames which swing or move in arcs of circles having different centers, (at 168 and 119, respectively,) whereby these parts will accommodate themselves to the varying distances between their centers when at their non-rotative positions before the frame 118 is lowered and while being rotated after said frame 118 has been lowered. The said plate 161 is pivotally arranged upon the said shaft 147, as indicated in the dotted outline in Fig. 7 of the drawings, and the said pin 165, which is fast on the plate 162, extends into the slot 163 of the plate 161. Pivotally arranged upon the said shaft 147, so as to be capable of a swinging or oscillatory movement, is a cradle or swing-frame 167, from the one side of which extends the pin 166, which extends into the slot 164 of the plate 162. To a laterally-extending bar 168 of said swing-frame 167 is connected a downwardly-extending arm 169, bearing an inking-roller 170, which is brought against the printing-surface of the printing-roller 121, as indicated in Fig. 8, by the action of a spring 171.

Having thus described the combined advertisement-printing and feed mechanism for carrying the tape 117 beneath the normally raised cutter 127, I will now describe the action of the said cutter for cutting the tape and producing the ticket or card 128.

The previously-mentioned shear-blade or cutter 127 is fulcrumed upon a pin 172, which extends from the side and at or near one end of the bar 126 and is made with a downwardly-extending and curved finger or arm 173. A spring 174, secured to said finger or arm 173 and the said pin 172, will cause said blade or cutter 127 to be raised when the machine is at rest or after each ticket or card has been cut from the tape 117. To cause the said cutter to be lowered, as indicated in Fig. 13, during each movement of the main shaft 50 when actuated by means of its crank or handle 73, I have provided the said shaft 50 with a stud or pin 175, which extends from the side of said shaft, as shown, and against which is arranged a slotted part 177 of a thimble 176, slidably as well as rotatably arranged upon the free end of said shaft 50. A spring 178 within said thimble causes the said slotted part 177 to be forced against the said post or stud 175, and when the said shaft 50 is moved the thimble moves with said shaft, and thereby brings a post or stud 179 on said thimble against the curved arm or finger 173 to lower said blade or cutter 127 and cut the tape, as will be clearly understood. By pulling the said thimble 176 on said shaft 50 in an outward direction of the arrow in Fig. 12 the slotted part 177 is removed from its engagement with the pin or stud 175, and then by slightly turning said thimble on the end of the shaft 50 the edge 181 of a shoulder 180 is brought against the pin or stud 175, so that the pin or stud 179 on the thimble is sufficiently removed from the finger or arm 173 so as not to actuate said arm, and the cutter 127 can thereby be placed in its inoperative position, if desired, although the other parts of the mechanism are still in operation.

In order that the ticket or card 128, which has been severed from the tape 117, may have its under surface pressed directly through the opening 136 in the card-holder and upon the printing-surfaces of the printing-disks 80, 81, 82, 83, 91, and 96, I have secured upon the cross-bar 168 of the cradle or swing-frame 167 an arm or lever 182, which extends forwardly and is preferably curved, as shown, being provided at the front end portion with a presser-bar 183. The said presser-bar 183 is pressed directly upon the upper surface of the severed ticket or card upon the said printing rollers or disks. The said arm or lever 182 has extending therefrom in a downward direction another suitably-curved arm 184, which is provided with a heel portion 185, as represented in Figs. 10 and 11, against which a roller 186 on the side of the previously-mentioned cam-disk 149 is brought and for an instant raises the said arm 184 while in rolling and lifting engagement with the heel portion 185, and thereby sufficiently lowering the arm 182 and its presser-bar 183 to depress the ticket 128 through the opening 136 in the card or ticket holder when the latter is in its lowered position to print the amount of sale, the initial or number of the clerk, and the department of the sale upon the under surface of the ticket.

When the ticket or card has received the printed matter, a spring 187, connected with the arm 182 and with the frame portion 86, will return said arm 182 and its presser-bar and the arm 184 to their initial normal positions. (Indicated in Fig. 8.) Extending from the side of the frame 86 is a pin 192, on which is arranged a bell-crank 191. The said bell-crank comprises the two arms 190 and 195, the said arm 190 being provided at its lower end with an extension 189 on the side thereof. A spring 193, which encircles the said pin 192, has its two end portions resting, respectively, against the said extension 189 and against a post 194 on the frame 86, as illustrated. Pivotally arranged upon a screw or pin 200 upon the upper end of the arm 195 of said bell-crank 191 is a member 196, having a right-angled portion 197, provided with a serrated edge 198, which portion 197 and edge 198 of said member 196 moves from the position in Fig. 8 to a position over the end of the ticket or card 128, Fig. 9, grasping the said card and during its return to the position represented in said Fig. 8 sliding the card or ticket 128 over the part 132 and out of the delivery-opening 114 in the face-plate of the register-case. The said movement of the member 196 and its right-angled portion 197 from the positions indicated in Figs. 8 and 10 to the positions represented in Figs. 9 and 11 is produced by moving the bell-crank 190 from its normal position (shown in said Fig. 10) to the position shown in Fig. 11 by bringing a projection 188 during the rotary movement of the previously-mentioned cam-disk 149 directly upon and into pressing contact with the extension 189 upon the side of the arm 191. The two arms of the spring 193 are spread apart, and when the cam-disk 149 returns to its initial position the spring-arms of the spring 193 will return the bell-crank to its position shown in Fig. 10, and the serrated edge of the member 197 forces the card or ticket from the delivery-shelf 132. In order that the said serrated edge 198 will be passed over the edge and above the surface of the ticket or card when passing from the position shown in Fig. 10 to that represented in Fig. 11 without bending the card, a pivoted plate 199, which is retained in a vertical position by means of a spring 201, is used, over which the arm or member 197 slides and lifts the serrated edge 198 over the edge and surface of the card to allow said edge 198 to drop directly upon the card when said arm 197 drops behind said pivoted plate 199. The pivotal arrangement of said plate 199 is such that when the right-angled portion 197 of the member 196 during its return movement is brought against the straight edge 157 of the pivoted plate 199 the said plate will turn on its pivotal pin, whereby the portion 197 is passed over said plate 199 without being lifted and permits said arm 197 and its serrated edge to return to its initial normal position while forcing the printed ticket from the machine. After the said right-angled portion 197 of the member 196 has reached the position indicated in Fig. 11 and the card or ticket has been delivered the spring 201, connected with the disk 199, will again bring the said disk 199 into its operative position to lift the portion 197 of the member 196 at the next operation.

In addition with the various devices and mechanism just described I may employ a tape device for printing thereon for record in consecutive order the various amounts of sales made, the initial or numbers of the clerks who made the sales, and the departments in which the sales were made. This device consists, essentially, of a support 202, Figs. 10 and 11, having a pair of pins or spindles 203 and 204, carrying a tape 205. The tape 205, as will be seen from Figs. 8 and 9, is unrolled from a roll 206 on the pin 203 and passes beneath the presser-bar 183 and is reeled upon the roll 207 on the pin 203. The intermittent motion of the tape 205 from the roll 206 to the roll 207 is produced, Figs. 10 and 11, by a spring-pawl 248, pivoted to the printing-arm 182 and engaging the ratchet 249 on the roll 207, said pawl effecting the intermittent rotation of said roll 207 during each upward or return stroke of the arm 182. A spring-dog 250, pivoted to the side of the frame-piece 202, prevents reverse rotation of said roll 207.

From an inspection of Fig. 11 it will be seen that during the return movement of the cam-disk 149 the said roller or wheel 186 will again be brought against the shoe 185 of the arm 184, whereby the lever or arm 182 and presser-bar 183 are again depressed in the manner previously stated. At the same time the said cam-disk 152 moves back on shaft 50 until a stop 206 on said disk 152 is brought against a finger 208 of a spring-actuated detent or dog 207, whereby the complete return of the said disk 152 is interrupted for the time, while the bell-crank 191 and the ticket-removing arm or finger connected therewith remove the printed ticket from the holder and while the presser-bar 183 is once more depressed into the opening 136 and the tape 205 is printed upon. The object of the stop 206 on the disk 152 is that the gear-teeth 153 on said disk 152 will not be brought in engagement with the teeth of the pinion 151, and thereby cause the register-wheel shaft 147 to turn backward or lock the mechanism. The complete return of the said disk 152 is finally completed by returning the crank arm or handle 73 to its initial normal position, whereby the shaft 147, the gear 151, the detent 207, and the arm 208 are again raised, whereby the arm 208 is lifted above the stop 206, and the spring 156 returns said disk 152 to its initial normal position without having brought the gear-teeth 153 in mesh with the pinion 151. A stop 209 on said disk 152 is brought against the shoe end of the arm 184, and all the parts of the machine are now normally at rest.

In addition with the above-described mechanism may be employed a dating device, also provided with a set of disks bearing numbers for numbering the tickets cut from the tape 117 in their consecutive order when delivered from the machine. This device is represented more particularly in Figs. 19 to 27, inclusive. The same consists, essentially, of a suitable frame 210, having the two side pieces 211 and 212 and a front wall 213, provided with a pair of forwardly-extending and perforated ears or lugs 214, resting directly upon the main shaft 50. On a pin or stem extending from the side of the frame portion 86 is an upwardly-extending arm 216, which is provided at the top with an inking-pad 217 and has at its lower end portion a forwardly-extending bifurcated end member 218, which embraces a pin or rod 219, extending from one of the sides, as 211, of the frame 210. Thus when in its normal and inoperative position the said frame 210 is supported upon the main shaft 50 and by means of said pin or rod 219 in the bifurcated end member 218 of the arm 216 and the weight of the said pivoted frame will cause the arm 216 to stand in an upright position with its inking-pad 217 directly over the several printing-disks supported on a spindle 220, arranged in bearings in the opposite sides 211 and 212. Upon the said spindle 220 I have arranged three printing-wheels 221, 222, and 223 and their intermediately-placed ratchet-wheels 224, 225, and 226, with which engage suitable toothed wheels 227, 228, and 229 for setting the said wheels (by hand) to the date desired to be printed upon the tape 117 before it is cut into a ticket. In Fig. 26 I have shown the preferred arrangement of the said wheels 227, 228, and 229 and the manner of operating the same. Connected with the side 211 of the frame 210 is a post 230, in the end of which is journaled a stem or rod 231. Upon the inner end portion of the said stem or rod 231 is arranged, by means of the hub 232, the said wheel 227. Against the end of the hub 232 and placed upon the stem or rod 231 is a tube 233, on the inner end portion of which is arranged, by means of a hub 234, the wheel 228, and against this hub 234 and upon the tube 233 is placed another tube 235, on the end portion of which is arranged a hub 236 of the wheel 229. The various tubes and stem or rod 231 extend through a bearing in the side 212, the end of the tube 235 having a finger-piece 237, the end of the tube 233 having a finger-piece 238, and the end of the stem or rod 231 having a finger-piece 239, all suitably secured in place, whereby the stem or rod 231 and the tubes 233 and 235 and their toothed wheels 227, 228, and 229 can be independently operated by hand for setting the respective printing-disks 221, 222, and 223. Upon the said shaft or spindle 220 there is also an arrangement of a suitable number of numbering wheels or disks 240 and having the intermediately-placed ratchet-wheels 241, with the teeth of which is brought every time that the frame 210 is raised, in the manner to be presently described, a spring-controlled actuating-dog 242, having detents or fingers 243 of different lengths for properly turning the numbering disks or wheels 240 to cause the printing of the numbers from "1" to "9,999" in consecutive order upon the tape 117 just before being cut into the tickets, and whereby all tickets are numbered consecutively before being ejected from the cash-register. A pivoted and spring-actuated detent or dog 244 may be used with the ratchet-wheels 241 to prevent their rearward movement.

Upon the main shaft 50 of the apparatus is a shouldered projection 244, which when said shaft 50 is turned moves from the position in Fig. 6 to that represented in Fig. 7 against a projection 245 on the side 212 of the frame 210, whereby the said frame is raised and the fingers or detents 243 of the dog 242 will move the respective numbering-wheels 240 one division. The downward movement of said frame 210 also brings all the printing disks or wheels in said frame against the under surface of the tape to print thereon the date and consecutive numbers.

When the various parts of the ticket-printing devices and the ticket-delivering means are in the positions represented in Fig. 11 of the drawings, a lever 246 can be moved into the position indicated in dotted outline in said Fig. 11, whereby the end 247 of said lever is brought against the previously-mentioned stop 209 on the disk 152 and whereby the ticket-printing devices, as well as the loosely-rotatable gear-wheel 151 on the shaft 147 and the devices for feeding the tape 117, will not be actuated, the frictional contact between the lower edge of the lever 246 and the stop 209 being sufficient to hold the parts in their inoperative positions. The disk 149 will simply actuate the device bearing the tape 205, so that the machine may be used simply as a device for recording the amounts of the sales upon the tape 205 or for a ticket-printing and ticket-delivering cash-register, or for both, as will be clearly understood.

Of course it will be clearly understood that I do not limit my invention to the various arrangements and combinations of the devices and their parts as hereinabove described and as illustrated in the accompanying drawings, for I am fully aware that various changes may be made without departing from the scope of my present invention.

Without therefore limiting my invention to the details of construction or forms of parts other than as embodied in the following clauses of the claim, what I claim as my invention, and desire to secure by Letters Patent, is—

1. In a cash-register, a main driving-shaft, the actuating hand-levers, the front plate having a series of numerals along which said levers may be moved in accordance with the values to be indicated, the movable segments substantially independent of but adapted to automatically follow said levers and to have their position controlled thereby, the register-wheels, and the gears connected therewith, combined with a ticket printing and delivery mechanism, a set of printing-disks comprised in said printing mechanism, an auxiliary spindle, and a set of tubular spindles arranged concentric with each other and with said auxiliary spindle, the gearing connected with each tubular spindle and said auxiliary spindle and the said hand-levers for independently actuating the said tubular spindles and said auxiliary spindle, and a gear for each tubular spindle and a gear on said auxiliary spindle, said gears being in operative mesh with the respective printing-disks, substantially as and for the purposes set forth.

2. In a cash-register, a main driving-shaft, the actuating hand-levers, the front plate having a series of numerals along which said levers may be moved in accordance with the values to be indicated, the movable segments substantially independent of but adapted to automatically follow the said levers and to have their position controlled thereby, the register-wheels, and the gears connected therewith, combined with a ticket printing and delivery mechanism, a set of printing-disks comprised in said printing mechanism, an auxiliary spindle, and a set of tubular spindles arranged concentric with each other and with said auxiliary spindle, the gearing connected with each tubular spindle and said auxiliary spindle and the said hand-levers for independently actuating the said tubular spindles and said auxiliary spindle and a gear for each tubular spindle and a gear on said auxiliary spindle, said gear being in operative mesh with the respective printing-disks, and means connected with the said ticket-printing mechanism, for normally retaining the said main shaft and devices to be actuated from said shaft in their immovable positions until the said locking means connected with the said printing mechanism has first been released from its holding engagement with the main shaft, substantially as and for the purposes set forth.

3. In a cash-register, a main driving-shaft, the actuating hand-levers, the front plate having a series of numerals along which said levers may be moved in accordance with the values to be indicated, the movable segments substantially independent of but adapted to automatically follow said levers and to have their positions controlled thereby, the registering-wheels, and the gears connected therewith, combined with a ticket printing and delivering mechanism, a printing-disk bearing on its surface the insignia of the clerks, and a hand-lever for setting said printing-disk, a second printing-disk bearing on its surface words indicating different sales-departments, and a hand-lever for setting said second printing-disk, substantially as and for the purposes set forth.

4. In a cash-register, a main driving-shaft, the actuating hand-levers, the front plate, having a series of numerals along which said levers may be moved in accordance with the values to be indicated, the movable segments substantially independent of, but adapted to automatically follow said levers and to have their positions controlled thereby, the registering-wheels, and the gears connected therewith, combined with a ticket printing and delivering mechanism, a printing-disk bearing on its surface the insignia of the clerks and a hand-lever for setting said printing-disk, a second printing-disk bearing on its surface words indicating different sales departments, and a hand-lever for setting said second printing-disk, and means connected with said ticket-printing mechanism, for normally retaining the said main shaft and devices to be actuated from said shaft in their immovable positions until said locking means connected with the said printing mechanism has first been released from its holding engagement with the main shaft, substantially as and for the purposes set forth.

5. In a cash-register, a main driving-shaft, the actuating hand-levers, the front plate having a series of numerals along which said levers may be moved in accordance with the values to be indicated, the movable segments substantially independent of but adapted to automatically follow the said levers and to have their position controlled thereby, the register-wheels and the gears connected therewith, combined with a ticket printing and delivery mechanism, a set of printing-disks comprised in said printing mechanism for printing the amount of sale on each ticket, the series of spindles, the gearing connecting said spindles with said hand-levers, the gearing connecting said spindles with said disks, an independently-acting printing-disk bearing on its surface the insignia of the clerks and a hand-lever for setting said insignia-bearing disk, substantially as and for the purposes set forth.

6. In a cash-register, a main driving-shaft, the actuating hand-levers, the front plate having a series of numerals along which said levers may be moved in accordance with the values to be indicated, the movable segments substantially independent of but adapted to automatically follow the said levers and to have their position controlled thereby, the register-wheels and the gears connected therewith, combined with a ticket printing and delivery mechanism, a set of printing-disks comprised in said printing mechanism for printing the amount of sale on each ticket, the series of spindles, the gearing connecting said spindles with said hand-levers, the gearing connecting said spindles with said printing-disks, an independent-acting printing-disk bearing on its surface the insignia of the clerks and a hand-lever for setting said insignia-bearing disk, and a locking means in normal holding engagement with the main driving-shaft for retaining the said main shaft and devices to be actuated from said shaft in their immovable positions until first released by the said hand-lever for setting the said insignia-bearing disk, substantially as and for the purposes set forth.

7. In a cash-register, a main driving-shaft, the actuating hand-levers, the front plate having a series of numerals along which said levers may be moved in accordance with the values to be indicated, the movable segments substantially independent of but adapted to automatically follow said levers and to have their position controlled thereby, the register-wheels and gears connected therewith, combined with a ticket printing and delivery mechanism, a set of printing-disks comprised in said printing mechanism for printing the amount of sales on each ticket, the series of spindles, the gearing connecting said spindles with said hand-levers, the gearing connecting said spindles with said printing-disks, an independently-acting printing-disk bearing on its surface the insignia of the clerks, and a hand-lever for setting said insignia-bearing disk, a second independently-acting printing-disk bearing on its surface the words indicating different sales departments, and a hand-lever for setting said second printing-disk, substantially as and for the purposes set forth.

8. In a cash-register, a main driving-shaft, the actuating hand-levers, the front plate having a series of numerals along which said levers may be moved in accordance with the values to be indicated, the movable segments substantially independent of but adapted to automatically follow the said levers and to have their positions controlled thereby, the register-wheels and gears connected therewith, combined with a ticket printing and delivery mechanism, a set of printing-disks comprised in said printing mechanism for printing the amount of sales on each ticket, the series of spindles, the gearing connecting said spindles with said hand-levers, the gearing connecting said spindles with said printing-disks, an independently-acting printing-disk bearing on its surface the insignia of the clerks and a hand-lever for setting said insignia-bearing disk, a second independently-acting printing-disk bearing on its surface the words indicating the different sales departments, and a hand-lever for setting said second printing-disk, and a locking means in normal holding engagement with the main driving-shaft for retaining the said main shaft and the devices which are actuated from said shaft in their immovable positions until said locking means are released from their holding engagement with the main shaft by the movement of the said hand-lever for setting the said insignia-bearing disk, substantially as and for the purposes set forth.

9. In a cash-register, a main driving-shaft, the actuating hand-levers the front plate having a series of numerals along which said levers may be moved in accordance with the values to be indicated, the movable segments substantially independent of but adapted to automatically follow the said levers and to have their positions controlled thereby, the register-wheels and the gears connected therewith, combined with a tape-holder, a ticket-holder, a feeding device for feeding the said tape into said ticket-holder, means for severing the end portion of the tape to provide the ticket, and a printing device for printing the registered amount on said ticket, substantially as and for the purposes set forth.

10. In a cash-register, a main driving-shaft, the actuating hand-levers, the front plate having a series of numerals along which said levers may be moved in accordance with the values to be indicated, the movable segments substantially independent of but adapted to automatically follow said levers and to have their positions controlled thereby, the register-wheels, and the gears connected therewith, combined, with a tape-holder, a ticket-holder, a feeding device, for feeding the said tape into said ticket-holder, means for severing the end portions of the tape, to provide the ticket, and a printing device for printing the registered amount on said ticket, and means connected with the said ticket-printing mechanism, for normally retaining the said main shaft and devices to be actuated from the said shaft in their immovable positions until said locking means connected with the said printing mechanism has first been released from its holding engagement with the main shaft, substantially as and for the purposes set forth.

11. In a cash-register, a main driving-shaft, the actuating hand-levers, the front plate having a series of numerals along which said levers may be moved in accordance with the values to be indicated, the movable segments substantially independent of but adapted to automatically follow the said levers and to have their position controlled thereby, the register-wheels and the gear connected therewith, combined with a tape-holder, a ticket-holder, a feeding device for feeding the said tape into said ticket-holder, a means for severing the end portions of the tape to provide the ticket, and a printing device for printing the registered amount on said ticket, comprising a set of independently-movable printing-disks, the series of spindles, the gearing connecting said spindles with said hand-levers, the gearing connecting said spindles with said printing-disks, and means connected with the said ticket-printing mechanism, for normally retaining the said main shaft and devices to be actuated from said shaft in their immovable positions until said locking means connected with the said printing mechanism has first been released from its holding engagement with the main shaft, substantially as and for the purpose set forth.

12. In a cash-register, a main driving-shaft, the actuating hand-levers, the front plate having a series of numerals along which said levers may be moved in accordance with the values to be indicated, the movable segments substantially independent of but adapted to automatically follow the said levers and to have their positions controlled thereby, the register-wheels and the gears connected therewith, combined with a tape-holder, a ticket-holder, a feeding device for feeding the said tape into said ticket-holder, means for severing the end portion of the tape to provide the ticket, and a printing device for printing the registered amount on said ticket, an auxiliary spindle, a set of tubular spindles arranged concentric with each other and with said auxiliary spindle, the gearing connected with each tubular spindle and said auxiliary spindle and the said hand-levers for independently actuating the said tubular spindles and said auxiliary spindle, and a gear on each tubular spindle and a gear on said auxiliary spindle, said gears being in operative mesh with the respective printing-disks, substantially as and for the purposes set forth.

13. In a cash-register, a main driving-shaft, the actuating hand-levers, the front plate having a series of numerals along which said levers may be moved in accordance with the values to be indicated, the movable segments substantially independent of but adapted to automatically follow the said levers and to have their positions controlled thereby, the register-wheels and the gears connected therewith, combined with a tape-holder, a ticket-holder, a feeding device for feeding the said tape into said ticket-holder, means for severing the end portion of the tape to provide the ticket, and a printing device for printing the registered amount on said ticket, an auxiliary spindle, a set of tubular spindles, arranged concentric with each other and with said auxiliary spindle, the gearing connected with each tubular spindle and said auxiliary spindle and the said hand-levers for independently actuating the said tubular spindles and said auxiliary spindle and a gear on each tubular spindle and a gear on said auxiliary spindle, said gears being in operative mesh with the respective printing-disks, and means connected with the said ticket-printing mechanism, for normally retaining the said main shaft and devices to be actuated from said shaft in their immovable positions until said locking means connected with said printing mechanism has first been released from its holding engagement with the main shaft, substantially as and for the purposes set forth.

14. In a cash-register, a main driving-shaft, the actuating hand-levers, the front plate having a series of numerals along which said levers may be moved in accordance with the values to be indicated, the movable segments substantially independent of but adapted to automatically follow said levers and to have their positions controlled thereby, the register-wheels, and the gears connected therewith, combined, with a tape-holder, a pivoted ticket-holder having a printing-opening, a feeding device for feeding the said tape into said ticket-holder, means for severing the end portion of the tape to provide the ticket, a printing device for printing the registered amount on said ticket and means controlled by the operation of said main shaft for oscillating said ticket-holder and bringing the ticket therein in printing relation to said printing device, substantially as and for the purposes set forth.

15. In a cash-register, a main driving-shaft, the actuating hand-levers, the front plate, having a series of numerals along which said levers may be moved in accordance with the values to be indicated, the movable segments substantially independent of but adapted to automatically follow said levers and to have their positions controlled thereby, the register-wheels, and the gears connected therewith, combined with a tape-holder, a pivoted ticket-holder having a printing-opening, a feeding device for feeding the said tape into said ticket-holder, means for severing the end portion of the tape to provide the ticket, a printing device for printing the registered amount on said ticket, and means controlled by the operation of said main shaft for oscillating said ticket-holder and bringing the ticket therein in printing relation to said printing device, and means connected with said ticket-printing mechanism, for normally retaining the said main shaft and devices to be actuated from said shaft in their immovable positions until said locking means connected with the said printing mechanism has been released from its holding engagement with the main shaft, substantially as and for the purposes set forth.

16. In a cash-register, a main driving-shaft, the actuating hand-levers, the front plate having a series of numerals along which said levers may be moved in accordance with the values to be indicated, the movable segments substantially independent of but adapted to automatically follow said levers and to have their positions controlled thereby, the register-wheels, and the gears connected therewith, combined with a tape-holder, a pivoted ticket-holder having a printing-opening, a feeding device for feeding the said tape into said ticket-holder, means for severing the end portion of the tape to provide the ticket, a printing device for printing the registered amount on said ticket, and means controlled by the operation of said main shaft for oscillating said ticket-holder and bringing the ticket therein in printing relation to said printing device, said printing device comprising, a set of independently-moving printing-disks, the series of spindles, the gearing connecting said spindles with said hand-levers, and the gearing connecting said spindles with said printing-disks; substantially as and for the purposes set forth.

17. In a cash-register, a main driving-shaft, the actuating hand-levers, the front plate having a series of numerals along which said levers may be moved in accordance with the values to be indicated, the movable segments substantially independent of but adapted to automatically follow said levers and to have their positions controlled thereby, the register-wheels, and the gears connected therewith, combined, with a tape-holder, a pivoted ticket-holder having a printing-opening, a feeding device for feeding the said tape into said ticket-holder, means for severing the end portion of the tape to provide the ticket, a printing device for printing the registered amount on said ticket and means controlled by the operation of said main shaft for oscillating said ticket-holder and bringing the ticket therein in printing relation to said printing device, and means connected with the said ticket-printing mechanism for normally retaining the said main shaft and devices to be actuated from said shaft in their immovable positions until said locking means connected with the said printing mechanism has first been released from its holding engagement with the main shaft, substantially as and for the purposes set forth.

18. In a cash-register, a main driving-shaft, the actuating hand-levers, the front plate having a series of numerals, along which the said levers may be moved in accordance with the values to be indicated, the movable segments substantially independent of but adapted to automatically follow the said levers and to have their positions controlled thereby, the register-wheels and the gears connected therewith, combined with a tape-holder, a ticket-holder, a feeding device for feeding the said tape, into said ticket-holder, an advertisement-printing roll or cylinder in said feeding device, means for severing the end portion of the tape to provide the ticket and a printing device for printing the registered amount on said ticket, and means connected with the said ticket-printing mechanism for normally retaining the said main shaft and devices to be actuated from said shaft in their immovable positions until said locking means connected with said printing mechanism has first been released from its holding engagement with the main shaft, substantially as and for the purposes set forth.

19. In a cash-register, a main driving-shaft, the actuating hand-levers, the front plate having a series of numerals along which said levers may be moved in accordance with the values to be indicated, the movable segments substantially independent of but adapted to automatically follow the said levers and to have their positions controlled thereby, the register-wheels, and the gears connected therewith, combined with a tape-holder, a ticket-holder, a feeding device for feeding the said tape into said ticket-holder, a date-printing device arranged beneath said tape-feeding device for printing the date on said tape before it is fed into said ticket-holder, means for severing the end portions of the tape to provide the ticket, and a printing device for printing the registered amount on said ticket, substantially as and for the purposes set forth.

20. In a cash-register, a main driving-shaft, the actuating hand-levers, the front plate having a series of numerals along which said levers may be moved in accordance with values to be indicated, the movable segments substantially independent of but adapted to automatically follow the said levers and to have their positions controlled thereby, the register-wheels, and the gears connected therewith, combined with a tape-holder, a ticket-holder, a feeding device for feeding the said tape into said ticket-holder, a date-printing device arranged beneath said tape-feeding device for printing the date on said tape before it is fed into said ticket-holder, means for severing the end portions of the tape to provide the ticket, and a printing device for printing the registered amount on said ticket, and means connected with the said ticket-printing mechanism, for normally retaining the said main shaft and devices to be actuated from said shaft in their immovable positions until said locking means connected with the said printing mechanism has first been released from its holding engagement with the main shaft, substantially as and for the purposes set forth.

21. In a cash-register, a main driving-shaft, the actuating hand-levers, the front plate having a series of numerals along which said levers may be moved in accordance with the values to be indicated, the movable segments subtantially independent of but adapted to automatically follow the said levers and to have their positions controlled thereby, the register-wheels, and the gears connected therewith, combined with a tape-holder, a ticket-holder, a feeding device for feeding the said tape into said ticket-holder, a date-printing device arranged beneath said tape-feeding device for printing the date on said tape before it is fed into said ticket-holder, consisting, essentially of a pivotally-arranged frame, having a series of hand-set dating-wheels, and a series of automatically-operating numbering-disks for printing numbers in consecutive order on said tape, means for severing the end portion of the tape to provide the ticket, and a printing device for printing the registered amount on said ticket, substantially as and for the purposes set forth.

22. In a cash-register, a main driving-shaft, the actuating hand-levers, the front plate having a series of numerals along which said levers may be moved in accordance with the values to be indicated, the movable segments substantially independent of but adapted to automatically follow the said levers and to have their positions controlled thereby, the registering-wheels and the gears connected therewith, combined with a tape-feeding mechanism bearing a movable tape, upon which the registered sales are to be printed in consecutive order, and a set of printing-disks, with which the said tape is brought in printing relation, and means connected with the said ticket-printing mechanism, for normally retaining the said main shaft and devices to be actuated from said shaft in their immovable positions until said locking means connected with the said printing mechanism has first been released from its holding engagement with the main shaft, substantially as and for the purposes set forth.

23. In a cash-register, a main driving-shaft, the actuating hand-levers, the front plate having a series of numerals along which said levers may be moved in accordance with the values to be indicated, the movable segments substantially independent of but adapted to automatically follow the said levers and to have their position controlled thereby, the registering-wheels and the gears connected therewith, combined with a tape-feeding mechanism, bearing a movable tape upon which the registered sales are to be printed in consecutive order, and a set of printing-disks with which the said tape is brought in printing relation, and means connected with the said ticket-printing mechanism for normally retaining the said main shaft and devices to be actuated from said shaft in their immovable positions until said locking means connected with the said printing mechanism has first been released from its holding engagement with the main shaft, substantially as and for the purposes set forth.

24. In a cash-register, a main driving-shaft, the actuating hand-levers, the front plate having a series of numerals along which the said levers may be moved in accordance with the values to be indicated, the movable segments substantially independent of but adapted to automatically follow the said levers and to have their position controlled thereby, the registering-wheels, and the gears connected therewith, combined with a tape-feeding mechanism bearing a movable tape upon which the registered sales are to be printed in consecutive order and a set of printing-disks with which the said tape is brought in printing relation, an auxiliary spindle, and a set of tubular spindles arranged concentric with each other and with said auxiliary spindle, a train of gears, connected with each tubular spindle and said auxiliary spindle and the said hand-levers for independently actuating the said tubular spindles and said auxiliary spindle and a gear on each tubular spindle and a gear on said auxiliary spindle, said gears being in operative mesh with the respective printing-disks, substantially as and for the purposes set forth.

25. In a cash-register, a main driving-shaft, the actuating hand-levers, the front plate having a series of numerals along which the said levers may be moved in accordance with the values to be indicated, the movable segments substantially independent of but adapted to automatically follow the said levers and to have their positions controlled thereby, the registering-wheels and the gears connected therewith, combined with a tape-feeding mechanism bearing a movable tape, upon which the registered sales are to be printed in consecutive order, and a set of printing-disks with which the said tape is brought in printing relation, an auxiliary spindle, and a set of tubular spindles arranged concentric with each other and with said auxiliary spindle, a train of gears connected with each tubular spindle and the said auxiliary spindle and the said hand-levers for independently actuating the said tubular spindles and said auxiliary spindle and a gear on each tubular spindle and a gear on said auxiliary spindle, said gear being in operative mesh with the respective printing-disks, and means connected with the said ticket-printing mechanism, for normally retaining the said main shaft and devices to be actuated from said shaft in their immovable positions until said locking means connected with the said printing mechanism has first been released from its holding engagement with the main shaft, substantially as and for the purposes set forth.

26. In a cash-register, the combination, with a main actuating-shaft and the registering mechanism, of a tape-feeding device, a cutter-bar 126 on said device, a cutter pivotally connected with said bar 126, an arm 173 on said cutter, and means on said main shaft for actuating said cutter, consisting, essentially, of a thimble, and a post 179 on said thimble adapted to be brought in active engagement with said arm 173, substantially as and for the purpose set forth.

27. In a cash-register, the combination, with a main actuating-shaft, and the registering mechanism, of a tape-feeding device, a cutter-bar 126 on said device, a cutter pivotally connected with said bar 126, an arm 173 on said cutter, and means on said main shaft for actuating said cutter, slidably and rotatively arranged on said main shaft and having a slot 177, a post 175 on said shaft for actively connecting said thimble with said shaft, and a post 179 on said thimble adapted to be brought in active engagement with said arm 173, all arranged substantially as and for the purposes set forth.

28. In a cash-register, the combination, with a main actuating-shaft and the registering mechanism, of a series of printing-disks provided with teeth 84, a cam-shaped flange on said main actuating-shaft, and detents 106 having holding portions 107 adapted to be brought in holding engagement with the teeth 84 of said printing-disk, and an upwardly-extending member 108 on one of said detents adapted to be engaged by said cam-shaped flange on the main shaft for causing the holding engagement of said portions 107 with said teeth 84, substantially as and for the purposes set forth.

29. In a cash-register, the combination, with a main actuating-shaft and the registering mechanism, of a set of printing-disks 80, 81, 82 and 83 provided with gear-teeth, an auxiliary spindle 54, a gear 56 on said spindle in mesh with said disk 80, a tubular spindle 57 on said spindle 54, a gear 59 on said spindle 57 in mesh with said disk 81, a tubular spindle 61 on said spindle 57, a gear 63 on said spindle 61 in mesh with said disk 82, a tubular spindle 64 on said spindle 61, a gear 66 on said spindle 64 in mesh with the said disk 83 and means connected with the said spindles for independently actuating the same, substantially as and for the purpose set forth.

30. In a cash-register, the combination, with a main actuating-shaft and the registering mechanism, of a set of printing-disks 80, 81, 82 and 83 provided with gear-teeth, an auxiliary spindle 54, a gear 56 on said spindle in mesh with said disk 80, a tubular spindle 57 on said spindle 54, a gear 59 on said spindle 57 in mesh with said disk 81, a tubular spindle 61 on said spindle 57, a gear 63 on said spindle 61 in mesh with said disk 82, a tubular spindle 64 on said spindle 61, a gear 66 on said spindle 64 in mesh with said disk 83, and means connected with the said spindles for independently actuating the same, consisting of a set of hand-actuated levers of the registering mechanism, a gear 55 on the spindle 54, a gear 58 on the spindle 57, a gear 62 on the spindle 61, a gear 65 on the spindle 64, and a set of actuating-gears between each lever and the respective gears 55, 58, 62 and 65, substantially as and for the purposes set forth.

31. In a cash-register, the combination, with a pivoted tape-feeding device and a printing-disk, of a pivoted ticket-holder into which the end portion of said tape is fed, means for severing the tape to produce the ticket, said ticket-holder comprising a pair of holding-frames between which the ticket is held, each holding-frame having an opening and means adapted to be lowered upon the ticket held between the said openings, for forcing the ticket upon a printing-disk, substantially as and for the purposes set forth.

32. In a cash-register, the combination, with a pivoted tape-feeding device and a printing-disk of a pivoted ticket-holder into which the end portion of said tape is fed, means for severing the tape to produce the ticket, said ticket-holder comprising a pair of holding-frames between which the ticket is held, each holding-frame having an opening and means adapted to be lowered upon the ticket held between the said openings, for forcing the ticket upon a printing-disk, consisting, essentially, of a presser-bar 183, a pivoted arm 182 to which said presser-bar is attached, and means for causing an oscillatory motion of said arm 182, substantially as and for the purposes set forth.

33. In a cash-register, the combination, with a pivoted tape-feeding device, of a pivoted ticket-holder into which the end portion of said tape is fed, means for severing the tape to produce the ticket, said ticket-holder comprising a pair of holding-frames between which the ticket is held, each holding-frame having an opening, and means adapted to be lowered upon the ticket held between the said openings, for forcing the ticket upon a printing-disk, consisting, essentially, of a presser-bar 183, a pivoted arm 182 to which said presser-bar is attached, and means for causing an oscillatory motion of said arm 182, an actuating-shaft 50, a downwardly-extending arm connected with said arm 184, and a cam-disk on said shaft provided with an actuating means adapted to be brought in operative engagement with a portion of said arm 184, for causing an oscillatory motion of said arm 182, substantially as and for the purposes set forth.

34. In a cash-register, the combination, with, a frame portion 86, and a pivoted ticket-holder having a delivery member, of a spring-controlled bell-crank, a ticket-grasping arm connected with said bell-crank, comprising, the members 196 and 197, and a serrated edge 198 on said member 197, and means on said frame portion for lifting said member 197 and its serrated edge above the edge of the ticket prior to the ticket-delivery, substantially as and for the purposes set forth.

35. In a cash-register, the combination, with, a frame portion 86, and a pivoted ticket-holder, having a delivery member, of a spring-controlled bell-crank, a ticket-grasping arm connected with said bell-crank, comprising, the member 196 and 197, and a serrated edge 198 on said member 197, and means on said frame portion for lifting said member 197 and its serrated edge above the edge of the ticket prior to the ticket-delivery consisting essentially of a pivoted and spring-controlled cam-plate, substantially as and for the purposes set forth.

36. In a cash-register, the combination, with, a frame portion 86, and a pivoted ticket-holder having a delivery member, of a spring-controlled bell-crank, a ticket-grasping arm connected with said bell-crank, comprising the members 196 and 197, and a serrated edge 198 on said member 197, and means on said frame portion for lifting said member 197 and its serrated edge above the edge of the ticket prior to the ticket-delivery, and means for actuating said bell-crank, consisting of a main shaft 50, a cam-disk 152, on said shaft and a projection 188 on said cam-disk adapted to be brought in engagement with a portion of said bell-crank, substantially as and for the purposes set forth.

37. In a cash-register, the combination, with a register-wheel shaft 147, and a toothed wheel 151 on said shaft, of a tape-feeding device, a feeding-roll in said device, means on said shaft for actuating said feeding-roll and means for actuating said wheel 151 and the parts of said tape-feeding device, comprising the main actuating-shaft 50, a cam-disk 152 on said shaft, and gear-teeth 153 on said cam-disk adapted to be brought in operative mesh with said wheel 151, substantially as and for the purposes set forth.

38. In a cash-register, the combination with a register-wheel shaft 147, a toothed wheel 151 on said shaft, and means substantially as described for raising and lowering the said shaft, of a pivoted detent having a portion in sliding engagement with the teeth of said wheel 151, a downwardly-extending arm connected with said detent, a main shaft 50, a cam-disk 152 on said shaft, gear-teeth 153 on said disk 152 adapted to mesh with said wheel 151, during the forward rotary motion of said disk 152 and when said shaft 147 and wheel 151 are lowered, and means on said disk 152 for arresting the return motion of said disk prior to the raising of the said shaft 147 and wheel 151, substantially as and for the purposes set forth.

39. In a cash-register, the combination with a register-wheel shaft 147, and a toothed wheel 151, and means for raising or lowering the same, of a pivoted detent having a portion in sliding engagement with the teeth of said wheel 151, a downwardly-extending arm connected with said detent, a main shaft 50, a cam-disk 152 on said shaft, gear-teeth 153 on said disk 152 adapted to mesh with said wheel 151 during the forward rotary motion of said disk 152 and when said shaft 147 and wheel 151 are lowered, and means on said disk 152 for arresting the return motion of said disk prior to the raising of the said shaft 147 and wheel 151, consisting, of a projection 206 on said disk adapted to be brought in holding contact with said arm on the detent, substantially as and for the purposes set forth.

40. In a cash-register, the combination, with a register-wheel shaft 147, and a toothed wheel 151, and means for raising and lowering the same, of a pivoted tape-feeding frame, comprising, a pair of rolls 124 and 125, and 121 and 120, one of said rolls being arranged on said shaft 147, a gear 158 on said shaft 147, a gear 160 connected with said roll 121 and an idle gear between said gears 158 and 168, substantially as and for the purposes set forth.

41. In a cash-register, the combination, with a register-wheel shaft 147, and a toothed wheel 151, and means for raising and lowering the same, of a pivoted tape-feeding frame, comprising a pair of rolls 124 and 125 and 121 and 120, one of said rolls being arranged on said shaft 147, a gear 158 on said shaft 147, a gear 160 connected with said roll 121, and an idle gear between said gears 158 and 160, a spindle 168, and a connecting-arm between said spindle and said shaft 147, a stud 166 extending from the side of said arm, a slotted plate 162 pivotally arranged on the spindle of said gear 160 and having its slotted portion arranged over said stud 166, a stud 165 extending from the side of said slotted plate 162, a second slotted plate 161 on which said idle gear is arranged, said plate 161 having its slotted portion movably arranged over said stud 165 on said plate 162 to compensate for any difference between the centers of said gears during the movements of said tape-feeding frame, substantially as and for the purposes set forth.

42. In a cash-register, the combination, with a main actuating-shaft and the registering mechanism, of a frame 210 pivotally connected with said shaft, a spindle in said frame, a set of enumerating wheels or disks, on said spindle, spring-controlled detents in operative engagement with said wheels or disks and means on said shaft and pivoted frame 210, for producing a swinging motion of said frame when said shaft is actuated, substantially as and for the purposes set forth.

43. In a cash-register, the combination with a main actuating-shaft and the registering mechanism, of a frame 210 pivotally connected with said shaft, a spindle in said frame, a set of enumerating wheels or disks on said spindle, spring-controlled detents in operative engagement with said wheels or disks and means on said shaft and pivoted frame 210, for producing a swinging motion of said frame when said shaft is actuated, consisting, of a flange 180 having a stop 244, and a projection 245 on said frame 210 against which said stop 244 is brought for raising said frame and thereby causing said enumerating wheels or disks to be actuated, substantially as and for the purposes set forth.

44. In a cash-register, the combination, with a main actuating-shaft and the registering mechanism, of a frame 210 pivotally connected with said shaft, a spindle in said frame, a set of enumerating wheels or disks on said spindle, spring-controlled detents in operative engagement with said wheels or disks, and means on said shaft and pivoted frame 210, for producing a swinging motion of said frame when said shaft is actuated, and a set of hand-operated dating-wheels in said frame, substantially as and for the purposes set forth.

45. In a cash-register, the combination, with a main actuating-shaft and the registering mechanism, of a frame 210 pivotally connected with said shaft, a spindle in said frame, a set of enumerating wheels or disks on said spindle, spring-controlled detents in operative engagement with said wheels or disks, and means on said shaft and pivoted frame 210 for producing a swinging motion of said frame when said shaft is actuated, consisting, of a flange 180 having a stop 244, and a projection 245 on said frame 210 against which said stop 244 is brought for raising said frame and thereby causing said enumerating wheels or disks to be actuated, and a set of hand-operated dating-wheels in said frame, substantially as and for the purposes set forth.

46. In a cash-register, the combination, with a main actuating-shaft and the registering mechanism, of a frame 210 pivotally connected with said shaft, means for raising and lowering said frame 210, and a set of hand-actuated dating-wheels in said frame, substantially as and for the purposes set forth.

47. In a cash-register, the combination, with a main actuating-shaft and the registering mechanism, of a frame 210 pivotally connected with said shaft, means for raising and lowering said frame 210, and a set of hand-actuated dating-wheels in said frame, comprising, a set of disks, 221, 222 and 223, and intermediately-arranged ratchet-wheels, 224, 225 and 226, a spindle 231, a tubular spindle 233 on said spindle 231, a tubular spindle 235 on said spindle 233, a toothed wheel 227 on said spindle 231, a toothed wheel 228 on said spindle 233, and a toothed wheel 229 on said tubular spindle 235, said toothed wheels 227, 228 and 229 being in engagement with the ratchet-disks 224, 225 and 226 respectively, and finger-pieces 239, 238 and 237 respectively arranged on said spindles 231, 233 and 235, substantially as and for the purposes set forth.

Signed at New York, in the county of New York and State of New York, this 14th day of May, A. D. 1902.

ALBERT PFAFF.

Witnesses:
   ARTHUR MARION,
   CHAS. C. GILL.